(12) United States Patent
Tesvich

(10) Patent No.: US 10,094,091 B1
(45) Date of Patent: Oct. 9, 2018

(54) SEDIMENT SUCTION SINK AND METHOD FOR SEDIMENT CONTROL IN RIVERS, STREAMS, AND CHANNELS

(71) Applicant: John A. Tesvich, Buras, LA (US)

(72) Inventor: John A. Tesvich, Buras, LA (US)

(*) Notice: Subject to any disclaimer, the term of this patent is extended or adjusted under 35 U.S.C. 154(b) by 104 days.

(21) Appl. No.: 15/256,042

(22) Filed: Sep. 2, 2016

Related U.S. Application Data

(60) Provisional application No. 62/213,542, filed on Sep. 2, 2015.

(51) Int. Cl.
| | |
|---|---|
| *E02B 3/02* | (2006.01) |
| *E02B 3/04* | (2006.01) |
| *G01M 99/00* | (2011.01) |
| *E02F 3/88* | (2006.01) |
| *E02F 9/08* | (2006.01) |
| *E02F 3/92* | (2006.01) |

(52) U.S. Cl.
CPC .......... *E02F 3/8858* (2013.01); *E02F 3/9262* (2013.01); *E02F 3/9293* (2013.01); *E02F 9/08* (2013.01)

(58) Field of Classification Search
CPC .......... E02F 3/8858; E02F 9/08; E02B 3/023; E02B 3/041
See application file for complete search history.

(56) References Cited

U.S. PATENT DOCUMENTS

| | | | |
|---|---|---|---|
| 1,197,267 A | 9/1916 | Cressy | |
| 2,673,451 A * | 3/1954 | Gariel | B01D 21/2455 210/154 |
| 2,763,940 A | 9/1956 | Madgwick | |
| 2,961,782 A | 11/1960 | Bos | |
| 3,013,395 A | 12/1961 | Gaylord | |
| 3,591,936 A | 7/1971 | Van Geuns | |
| 3,972,137 A * | 8/1976 | Condolios | E02F 3/8808 37/308 |
| 3,975,842 A | 8/1976 | Andreae | |
| 4,058,914 A | 11/1977 | Kiss | |
| 4,149,251 A | 4/1979 | Noordermeer et al. | |
| 4,189,253 A | 2/1980 | Pekor | |
| 4,401,576 A | 8/1983 | Meurer | |
| 4,604,000 A | 8/1986 | van Weezenbeek | |
| 4,711,597 A | 12/1987 | Odgaard et al. | |

(Continued)

FOREIGN PATENT DOCUMENTS

| | | |
|---|---|---|
| DE | 2355416 | 5/1974 |
| DE | 19904958 | 8/2000 |

(Continued)

*Primary Examiner* — Tara Mayo-Pinnock
(74) *Attorney, Agent, or Firm* — Garvey, Smith & Nehrbass, Patent Attorneys, L.L.C.; Vanessa M. D'Souza; Julia M. Fitzpatrick

(57) ABSTRACT

The present invention relates to apparatuses, methods, and systems for removing sediment from waterway bottoms and pumping the sediment through pipelines. More particularly, the present invention relates to apparatuses, methods, and systems for sediment control and altering the average effective depth in a section of rivers, streams and channels for maintaining the navigability of waterways and coastal restoration. The apparatus and method of the present invention including a means for preventing and removing blockages of water flow in the pipelines.

21 Claims, 30 Drawing Sheets

(56) References Cited

U.S. PATENT DOCUMENTS

| | | | |
|---|---|---|---|
| 4,807,373 A | 2/1989 | Sloan et al. | |
| 4,819,347 A | 4/1989 | Lofgren | |
| 4,830,541 A | 5/1989 | Shatto | |
| 4,943,186 A | 7/1990 | Van Weezenbeek | |
| 5,135,579 A | 8/1992 | Goettl | |
| 5,143,623 A | 9/1992 | Kroll | |
| 5,145,425 A | 9/1992 | Little | |
| 5,285,587 A | 2/1994 | Krenzler | |
| 5,421,105 A | 6/1995 | Schulte | |
| 6,042,733 A | 3/2000 | Tucker | |
| 6,112,439 A | 9/2000 | Rinker | |
| 6,481,932 B1 * | 11/2002 | Riemers | E02B 17/021 114/266 |
| 6,550,162 B2 | 4/2003 | Price et al. | |
| 7,226,242 B2 | 6/2007 | LeBuffe | |
| 7,591,088 B1 | 9/2009 | Schuh et al. | |
| 7,621,059 B2 | 11/2009 | McCoy, Jr. et al. | |
| 7,676,966 B2 | 3/2010 | Taplin | |
| 7,850,857 B2 | 12/2010 | Tucker | |
| 7,943,039 B1 | 5/2011 | LeBuffe | |
| 8,522,459 B2 | 9/2013 | Pavan | |
| 2002/0012571 A1 | 1/2002 | Nichols | |
| 2005/0211607 A1 | 9/2005 | Armbruster | |
| 2009/0084735 A1 | 4/2009 | Taplin | |
| 2012/0067807 A1 | 3/2012 | Lappeman | |
| 2013/0022399 A1 | 1/2013 | Pierce, Jr. | |

FOREIGN PATENT DOCUMENTS

| | | |
|---|---|---|
| EP | 1048793 | 11/2000 |
| JP | 2005220598 | 8/2005 |
| WO | 2004/065700 | 8/2004 |
| WO | 2006/107984 | 10/2006 |
| WO | 2012/153169 | 11/2012 |
| WO | 2013/061006 | 5/2013 |

* cited by examiner

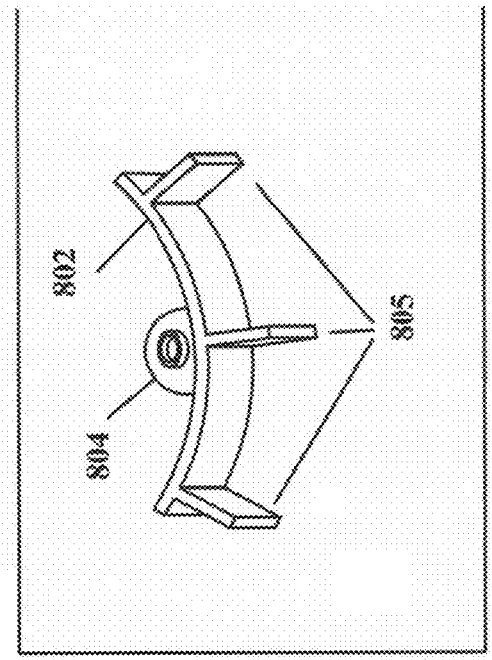
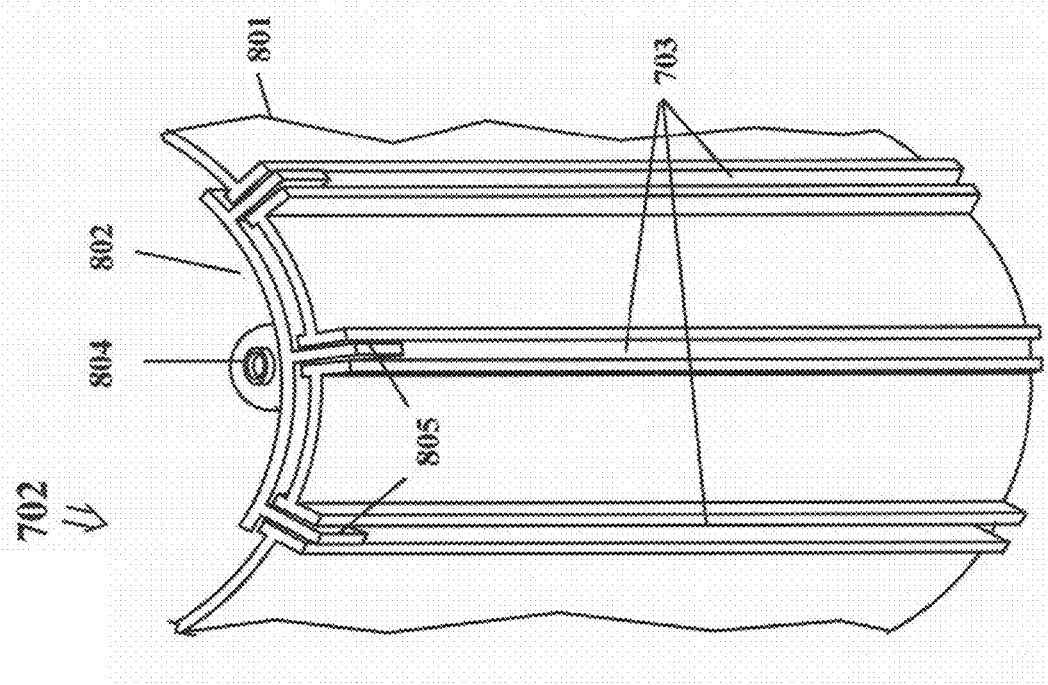

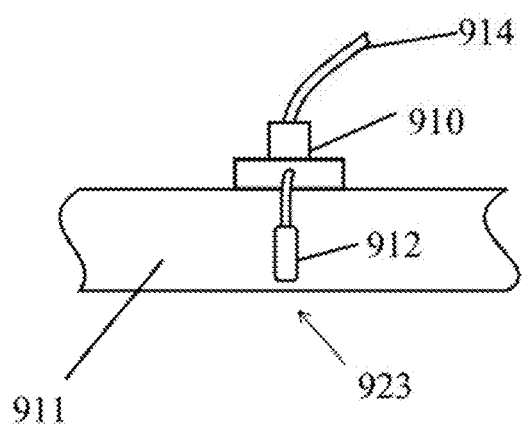
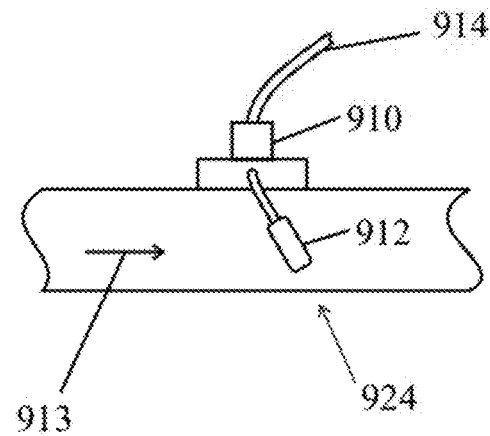
Fig. 36    Fig. 37
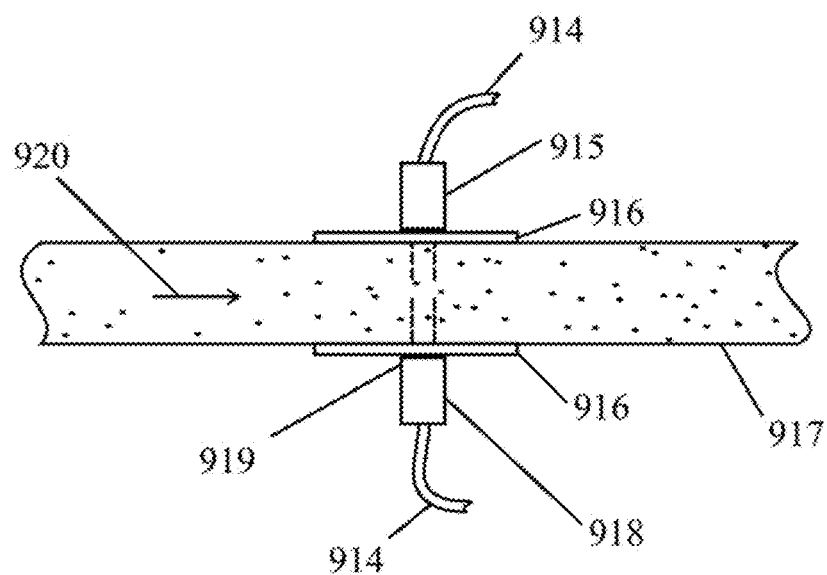
Fig. 38

SEDIMENT SUCTION SINK AND METHOD FOR SEDIMENT CONTROL IN RIVERS, STREAMS, AND CHANNELS

CROSS-REFERENCE TO RELATED APPLICATIONS

This application claims the benefit of U.S. Provisional Patent Application Ser. No. 62/213,542, filed 2 Sep. 2015, which is hereby incorporated herein by reference.

Priority of U.S. Provisional Patent Application Ser. No. 62/213,542, filed 2 Sep. 2015, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to apparatuses, methods, and systems for removing sediment from waterway bottoms and pumping the sediment through pipelines. More particularly, the present invention relates to apparatuses, methods, and systems for sediment control and altering the average effective depth in a section of rivers, streams and channels for maintaining the navigability of waterways and coastal restoration.

2. General Background of the Invention

Dredging water-bottoms is a common practice that is normally accomplished by floating vessels located on the water body, such as barges with draglines mounted on deck, or specialized hydraulic dredges like cutter-head suction dredges or hopper dredges. Dredging is mainly utilized for the purpose of maintaining water depth for navigation, but also is used to pump sediments to build or rebuild coastal lands, beaches and etc.

Shoaling of navigational channels is a natural process. Maintaining depth contours in navigational channels in the United States requires significant expenditures by the state and federal agencies (aka U.S. Army Corps of Engineers & etc.) that are responsible for that task. When dredging is being accomplished, the dredges are physically located in the navigational water body in the area that requires dredging. Navigation on the water-body is most often restricted in some way due to the dredging work being done. Sometimes in narrow channels, restriction is severe, and navigational is disrupted in intervals during the course of the dredging operations.

When dredges are employed for maintenance of water depth in a water-body the sediment that is removed may be deposited on-board the vessel such as for hopper barges, or it may be transposed via a mechanical bucket into a deeper area in the water-body usually where there is sufficient current to carry it some distance away, or in the case of a hydraulic suction dredge, it may be put into a pipeline and then deposited any amount of distance away as may be required.

Dredges can also be employed for moving sediment for the purpose of building, rebuilding or filling land. Depending on the type of dredge, the sediment is either hauled on-board, and then moved and deposited at another location or it is put into a hydraulic slurry pipeline that can move water laden sediment scores of miles away.

Coastal land loss is a worldwide problem. Coastal land loss is both a natural process and is often aggravated by man-made alterations to the natural environment. Natural land loss is caused by shoreline erosion caused by normal waves and currents within water-bodies. This type of erosion is further aggravated during natural storms. Natural subsidence of coastal wetlands is also commonly caused by compaction and biodegradation of organic material within the sediment layers under the surface. Man-made causes that can contribute to coastal land loss can include the following: 1) Locks and dams on streams and rivers, 2) placement of levees on rivers and streams for flood protection, 3) jetties on seashores, coastal inlets, rivers, and streams, 4) man-made canals for navigation, coastal development, oil & gas access and pipelines, and etc., 5) extraction of underground minerals, oil, and gas in coastal areas, 6) wakes of marine vessels, 7) sea level rise accelerated by global warming.

A prime example of an area that is experiencing significant coastal land-loss is present day coastal Louisiana. Louisiana has been losing its coastal wetlands at a rate as high as 16,000 acres a year. The rate in 2012 of wetlands loss was estimated to be around 10,600 acres per year. In the 1990's the state had begun addressing the coastal land-loss problem more aggressively. The devastation wrought by hurricanes Katrina, Rita, Gustav, and Ike in the 2005-2008 significantly amplified the need for coastal restoration, and the inter-related issue of coastal flood protection. In response the State of Louisiana developed its "Comprehensive Master Plan for Coastal Restoration and Flood Protection" or "Master Plan". The Master Plan is a comprehensive conglomerate of projects designed to address the needs for flood protection and wetlands restoration. The latest Master Plan is the 2012 version, and it is to be renewed every 5 years as studies advance the knowledge of the best methods for addressing the problems of coastal wetlands loss and flood protection. The estimated cost to carry out the projects included in the 2012 Master Plan is $50 billion.

The Master Plan includes many projects that will require dredging of sediments for rebuilding barrier islands and marsh creation. Dredging sediments and moving them within a pipeline is a proven way to build/rebuild coastal land. With numerous projects of dredging for marsh creation already completed, there are known cost/benefit figures for this rebuilding option. However, dredging methods, currently used for wetland creation projects, are relatively expensive, with significant fuel cost, labor cost, and mobilization and demobilization costs.

The Master Plan also includes numerous river diversion projects, including "large-scale" river diversions. There is significant and vocal support for these projects, even though sediment diversions are unproven in their ability to build/rebuild land. Proponents for sediment diversions believe that they are superior to dredging, when considering the cost long-term land-building, citing that burning diesel fuel (for dredges) for rebuilding lands is not eco-friendly and unsustainable because it is too costly.

Opponents of river diversions cite that it will take decades if not centuries to restore significant amounts of wetlands. Large-scale river diversions would also cause significant negative impacts and unintended consequences. Diverting large amounts of river water into a brackish-saltwater estuary raises concerns for 1) displacement of traditional fisheries, and critical fisheries habitat, 2) flooding issues for coastal communities, 3) introduction of invasive species, 4) introduction of river-borne pollutants including nutrients from agricultural runoff.

Large-scale river diversions would also have significant unintended consequences on the river channel itself. Diverting river water impacts the hydrodynamics of the river downstream because it takes water away from the traditional river channel, decreasing water velocity downstream. Therefore, river diversions are expected to increase shoaling in down-river areas. This can impact navigation and increase channel maintenance costs.

The current dilemma is that most of the sediments carried by the Mississippi River is wasted and winds up deposited in deep waters of the Gulf of Mexico. The future sustainability of Louisiana's wetlands and the viability of flood protection along the coastal area would be greatly improved if long-term, economical methods were developed for harvesting sediment from the river. An overall goal should be to utilize methods of moving sediment with lower cost while creating less negative unintended consequences. Presently, which of the currently available methods is better is an on-going debate.

It is the intent of the present invention to provide another method that is superior in many ways to currently available methods of harvesting sediments for coastal restoration. A method that is robust, dependable, for long-term harvesting of sediment from a river, such as the Mississippi River. The present invention will be less labor intensive, and environmentally cleaner than diesel-powered dredges, and will have less negative impacts than large-scale river diversions.

The bottom contours of many of U.S. Rivers are being mapped for navigational purposes. The Mississippi River, for example, is mapped and studied extensively by the US Army Corp of Engineers (USACE). Studies by the USACE have shown that burrow areas, where the river has been dredged for sediment removal, have a refill rate of around 80% in one year. The USACE also has computerized modeling programs that predict the effect of changes that affect the river's flow. Predictive computer models can be used to determine best locations for placement of fixed sediment harvesting apparatuses.

The prior art has numerous designs for dredging and sediment removal systems. Prior art teaches many variations in sediment collecting pipes, cells, basins and etc. Also there has been disclosed various methods of evacuating the sediments from the waterway using pump positive pressure or pump suction. The reason that most all of the dredging done today is still done by vessel-based suction dredge is because of its real-world adaptability and robustness in the design. The present invention is novel and unique in that the incorporation of a platform-based pump system gives it robustness, and the design of the mechanical parts gives it redundancy to deal with natural obstacles that cannot be avoided on the bottom of a muddy waterway.

The following references are incorporated herein by reference: U.S. Pat. Nos. 1,197,267; 2,961,782; 3,013,395; 3,591,936; 3,975,842; 4,058,914; 4,149,251; 4,401,576; 4,604,000; 4,711,597; 4,807,373; 4,819,347; 4,830,541; 4,819,347; 4,830,541; 4,943,186; 5,135,579; 5,143,623; 5,285,587; 5,421,105; 6,042,733; 6,112,439; 6,550,162; 7,226,242; 7,591,088; 7,621,059; 7,676,966; 7,850,857; 7,943,039; 8,522,459; U.S. Publication Document Nos.: 2002/0012571; 2005/0211607; 2009/0084735; 2012/0067807; 2013/0022399; PCT Publication Nos.: WO2004/065700; WO2006/107984; WO 2012/153169; WO2013/061006; Foreign Patent Publication Nos.: DE 19904958; EP 1048793; and JP 2005220598.

U.S. Provisional Patent Application Ser. No. 62/044,703, filed 2 Sep. 2014, and U.S. patent application Ser. No. 14/843,511, filed 2 Sep. 2015, are hereby incorporated herein by reference.

BRIEF SUMMARY OF THE INVENTION

The present invention relates to apparatuses, methods, and systems for removing sediment from waterway bottoms and pumping the sediment through pipelines. More particularly, the present invention relates to apparatuses, methods, and systems for sediment control and altering the average effective depth in a section of rivers, streams and channels for maintaining the navigability of waterways and coastal restoration.

The apparatus of the present invention preferably comprises a sediment harvesting platform preferably positioned above a water surface. A sediment suction inlet or sediment sink can be preferably positioned below the top level of source sediment or within a sand bar including a grating. The apparatus can include a sediment pump, a venturi tube with a sediment inlet, an auger/propeller, and a water jet, a flow control valve and a pipeline for pumping sediment. The apparatus can further comprise a water pump, a sediment conveyor including sediment inlets, and a remote controlled pulsing valve. The apparatus may further comprise sensor(s) and a programmable logic controller (PLC).

The apparatus of any embodiment of the present invention is preferably designed to prevent water flow blockage resulting from, for example, underground sand. The design preferably prevents water flow blockage when water is not flowing through the pipes and pipelines.

In one embodiment, check-valve(s) preferably block sediment from entering the piping system when water is not flowing.

In one embodiment, an apparatus of the present invention preferably comprises means for removing water flow blockages resulting from, for example, underground sand entering water flow in the pipes and pipelines when water is not flowing.

In one embodiment, vibrating mechanism(s) preferably remove blockages in pipes by sand or sediment. In one embodiment pressurized air is used to remove blockages in pipes by sand or sediment.

In one embodiment, a venturi having an auger/propeller is not included in the apparatus. The method of the present invention preferably comprises removing sediment from waterway bottoms with at least one apparatus of the present invention. The system of the present invention preferably comprises a plurality of apparatuses in either series or parallel design for sediment control and altering the average effective depth in a section of a waterway.

A preferred embodiment of the present invention is an apparatus comprising a sediment harvesting platform that can be placed in rivers and waterways to harvest sediment from sand bars. It is preferably a fixed platform, preferably constructed of steel, mounted above the water level. The platform preferably houses the power supply, controls, booster pump, and provides connections to sediment flow lines.

Preferably below the platform and deep within the sand bar, a sediment sink preferably draws in sediment by fluidizing sediment and pumping the sediment into a pipeline.

The sediment harvesting platform is preferably placed in the rivers bars that normally form closer to a river's bank.

In one embodiment, the platform can further comprise: (1) a secondary sediment pump; (2) a water pump; (3) a hydraulic pump and control unit; (4) power supply and connections; (5) sediment pipeline connections; and (6) monitoring and control unit.

The source of power for the sediment harvesting platform will be preferably electrical or diesel engine/generator, with land based electrical supply being a preferred embodiment.

In one embodiment, the power source is from land-based electricity.

In one embodiment, the power source is electricity from renewable sources.

In one embodiment, the power source is from alternative energy sources, including solar power, wind power, hydro-mechanical, and/or hydro-electric power generators.

In one embodiment, the power source is from fossil fuel powered engines.

In one embodiment, electrical power is preferably supplied to the platform by submarine cable.

In one embodiment, electrical power is preferably supplied to the platform by overhead power lines.

The sediment harvesting platform is preferably used to capture sediments to be put into long distance sediment pipelines that will be used to rebuild sections of coastal lands many miles away.

An embodiment of the present invention is an apparatus further comprising a sediment sink preferably positioned below the waterway surface. The sink preferably comprises: (1) a hydraulically or electrically driven sediment pump; (2) an auger to break up compacted sediments and feed the sediment inlet; (3) water jets to help liquefy or slurry the sediment for better sediment flow.

A preferred embodiment of the present invention is an apparatus further comprising a flow control valve that preferably regulates how much clean water is fed into the suction side of the sediment pump.

In order to extend the harvesting capacity, the sediment harvesting platform may also incorporate mechanical or hydraulic means to draw more sediment into the sink.

A preferred embodiment of the present invention is an apparatus further comprising a conveyor positioned radially outward from the sediment sink. The conveyors preferably include sediment inlets and preferably transport additional sediment from the area that surrounds the sediment platform.

In one embodiment, the conveyor is hydraulic.

In one embodiment, the conveyor is mechanical.

In one embodiment, the apparatus further comprises a plurality of conveyors.

In one embodiment, the apparatus further comprises a sensor mounted within it to preferably monitor important parameters in real time and send the measurements into a programmable logic controller (PLC) that will control the operation of the apparatus.

A preferred embodiment of the present invention includes a method for removing sediment from waterway bottoms with the apparatus of the present invention.

One embodiment is a method for removing sediment from waterway bottoms with a plurality of apparatuses of the present invention.

In one embodiment, this invention can be used to contribute additional sediment to smaller localized river diversions to boost that project's sediment delivery. In this embodiment, the invention is preferably designed to be scalable and can preferably work for both relatively small-scale apparatuses and large-scale apparatuses alike.

The properties of the invention will preferably allow for deployment of a fixed system within rivers and water streams that will be able to harvest sediment more cost effectively than existing methods. It will be much less labor intensive because of automation, and "greener" because it can operate off of the existing electrical power grid and can use alternative energy sources, such as solar, wind, and hydro.

In one embodiment, the invention is a system incorporating individual apparatus (unit) for removing sediment from waterway bottoms and pumping the sediment through pipelines.

In one embodiment, the invention is a system incorporating an array or arrays of apparatuses (units). In this embodiment, the apparatuses of the array are preferably connected together by pipelines in series or in parallel design.

In one embodiment, the present invention is a fixed suction inlet or "sediment sink" for evacuating sediment and any other type of granular material in a fluid state through a pipeline. In this embodiment, the apparatus/apparatus comprises a suction inlet and a sediment sink that preferably draws sediment and other material into a pipeline in a fluid state. The apparatus of this embodiment is preferably a mechanical element, which is preferably mounted in a fixed position below a source of sediment or granular material, for the purpose of evacuating the material by carrying it within a liquid (e.g. water) via a pipeline. The apparatus of this embodiment may be in the form of a cylindrical tube, or caisson that is driven into the sediment source. The apparatus of this embodiment is preferably positioned well below the level of the source sediment or granular material so that the material, which is in the proximity of the inlet, will preferably flow downward toward the inlet aided by gravity. The apparatus of this embodiment may be held in a fixed position by a structure under the normal surface of the sediment. For example in a river, the sediment inlet may be held by pilings driven into the seabed, well below the elevation of the suction inlet. The properties of the apparatus will allow for deployment of a fixed system within rivers and water streams that will be able to harvest sediment more efficiently, and have better control of sedimentation than existing methods.

In a more preferred embodiment of the present invention, the apparatus for removing sediment from waterway bottoms comprises a sediment harvesting platform preferably positioned above a water surface and a central vessel. The platform preferably comprises a shelter and a means for receiving electricity. The central vessel preferably further comprises a means for slurrying or liquefying sediment, a means for filtering the liquefied or slurried sediment, and a means for removing the liquefied or slurried sediment. The apparatus of this embodiment preferably further comprises a means for positioning and stabilizing the apparatus on a water bottom. The apparatus of this embodiment may also include a means for cleaning debris surrounding the central vessel.

A more preferred embodiment of the present invention includes a method of removing sediment from waterway bottoms with at least one apparatus of the more preferred embodiment of the present invention. A more preferred embodiment of the present invention includes a system comprising a plurality of apparatuses of the more preferred embodiment of the present invention in either series or parallel design for sediment control and altering the average effective depth in a section of a waterway.

In one embodiment, vents can be included near the sediment pump.

In one embodiment, the vents can include one or more scrapers to keep debris from clogging the vents and/or sediment pump.

In one embodiment, a water or air pressurized pump can be used to blow out the vents to clean the vents.

In one embodiment, the pump is removable, thereby making it easy to fix or clean.

In one embodiment, a central pipe can be an anchor to support the platform.

In one embodiment, one platform can manage multiple pipes and sediment pumps.

In one embodiment, multiple pipes flow into a single sediment manifold to be sent onshore.

In one embodiment, the sand/sediment preferably collapse in the cavity/pit and flow into the sediment pump to be slurried or liquefied and evacuated.

This invention brings many benefits in the task of harvesting sediments that a river bed provides while minimizing the negative impacts that traditional dredging or river sediment diversions would create. Most of the heavier sediments in the river travel along the river bottom especially when river velocities are lower. Heavier, larger grain sediments are preferred land building material for restoration purposes. This invention will preferably act like a sink in the bottom of the river bed and capture sediment passively as sediment moves down-river in the vicinity of the sink. Because it is on the bottom it will be able to capture sediment for a much longer period than sediment diversions. This invention will preferably provide a new method that can be used to control the sediment flow in a river or other waterway. By harvesting sediment from the river, it will preferably reduce down-river shoaling, and the associated costs of channel maintenance dredging.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 11 is a partial perspective view of an embodiment of the apparatus of the present invention showing a means for cleaning debris surrounding the central vessel and keeping the vents clear;

FIG. 12 is a partial perspective view of a vent comb with blades and an actuator attachment point;

FIG. 36 is a side view of a flow switch (in a closed position) of a preferred embodiment of the apparatus of the present invention;

FIG. 37 is a side view of a flow switch (in an open position) of a preferred embodiment of the apparatus of the present invention;

FIG. 38 is a side view of optical sensors of a preferred embodiment of the apparatus of the present invention.

DETAILED DESCRIPTION OF THE INVENTION

Figure 1:
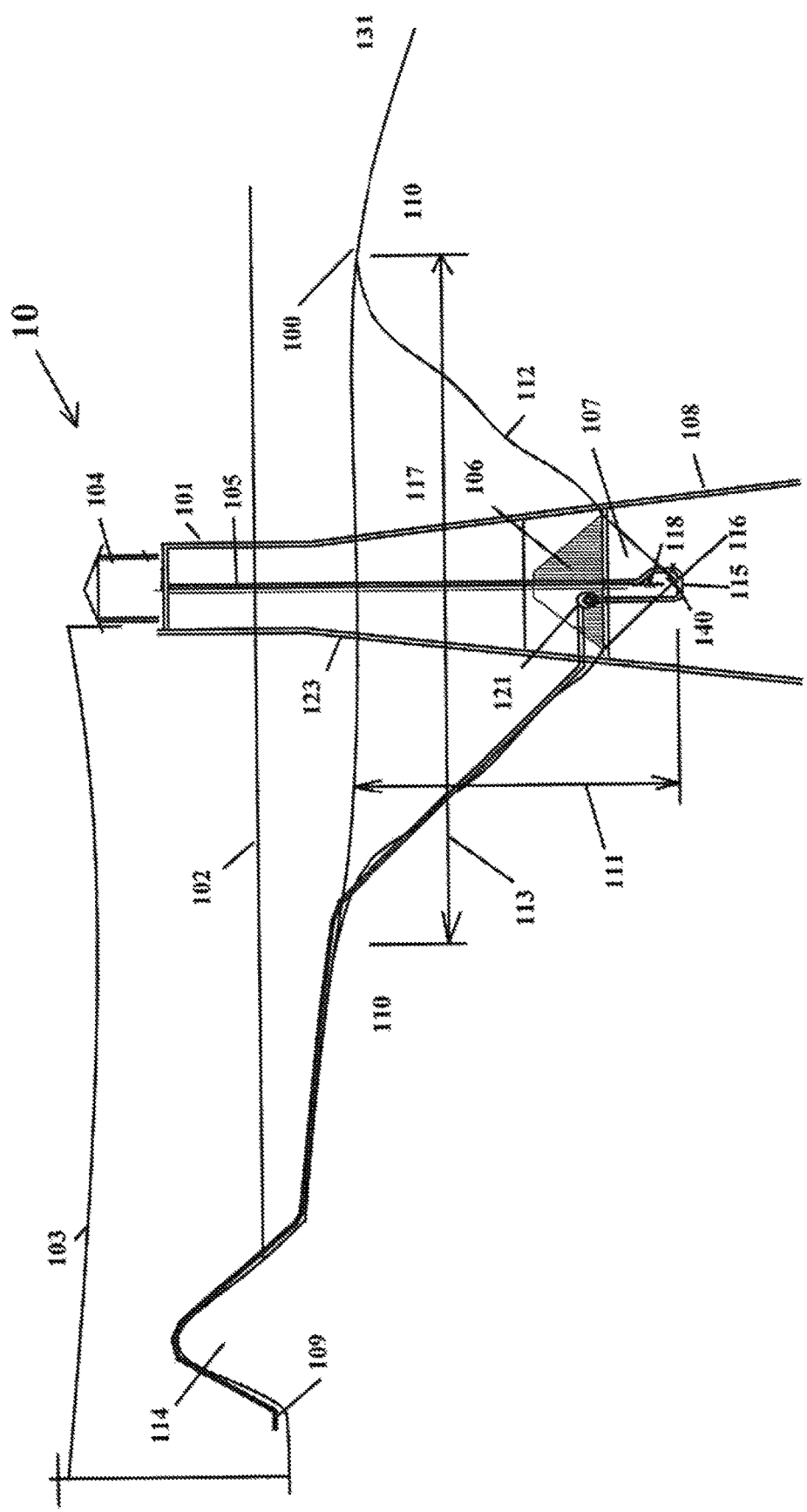
FIG. 1 is a side view of an embodiment of the apparatus of the present invention of a sediment harvesting platform in a cross-section of a river.

The present invention relates to apparatuses, methods, and systems for removing sediment from waterway bottoms and pumping the sediment through pipelines. More particularly, the present invention relates to apparatuses, methods, and systems for sediment control and altering the average effective depth in a section of rivers, streams and channels for maintaining the navigability of waterways and coastal restoration. The apparatus preferably comprises a sediment harvesting platform preferably positioned above a water surface. One or more sediment suction inlets or sediment sinks can preferably be positioned below the top level of source sediment or within a sand bar including a grating, a sediment pump, a venturi tube with a sediment inlet, an auger/propeller, and a water jet, a flow control valve, and a pipeline for pumping sediment. The apparatus may further comprise a water pump, a sediment conveyor including sediment inlets, and a remote controlled pulsing valve. The apparatus may further comprise sensor(s) and a programmable logic controller (PLC). The method of the present invention preferably comprises removing sediment from waterway bottoms with at least one apparatus of the present invention. The system of the present invention preferably comprises a plurality of apparatuses in either series or parallel design for sediment control and altering the average effective depth in a section of a waterway.

The apparatus of any embodiment of the present invention is preferably designed to prevent water flow blockage resulting from, for example, underground sand. The design preferably prevents water flow blockage when water is not flowing through the pipes and pipelines.

In one embodiment, check-valve(s) preferably block sediment from entering the piping system when water is not flowing.

In one embodiment, an apparatus of the present invention preferably comprises means for removing water flow blockages resulting from, for example, underground sand entering water flow in the pipes and pipelines when water is not flowing.

In one embodiment, vibrating mechanism(s) preferably remove blockages in pipes by sand or sediment.

In one embodiment pressurized air is used to remove blockages in pipes by sand or sediment.

In one embodiment, the jets of any embodiment is preferably designed to prevent water flow blockage of the pipes and pipelines.

In one embodiment, a venturi having an auger/propeller is not included in the apparatus.

In a more preferred embodiment of the present invention, the apparatus for removing sediment from waterway bottoms comprises a sediment harvesting platform preferably positioned above a water surface and a central vessel. The platform preferably comprises a shelter and a means for receiving electricity. The central vessel preferably further comprises a means for slurrying or liquefying sediment, a means for filtering said slurried or liquefied sediment, and a means for removing said slurried or liquefied sediment. The apparatus of this embodiment preferably further comprises a means for positioning and stabilizing the apparatus on a water bottom. The apparatus of this embodiment may also include a means for cleaning debris surrounding the central vessel.

An embodiment of the present invention includes a method of removing sediment from waterway bottoms with at least one apparatus of the more preferred embodiment of the present invention. Another embodiment of the present invention includes a system comprising a plurality of apparatuses of the more preferred embodiment of the present invention in either series or parallel design for sediment control and altering the average effective depth in a section of a waterway.

FIG. 1 is a side view showing an embodiment of the apparatus 10 of the present invention. In FIG. 1, sediment harvesting platform 101 is seen in a cross-section of a river having river surface 102 and river bottom 100. Sediment harvesting platform 101 can be positioned above a water surface, a sediment suction inlet or sediment sink 107 preferably positioned below the top level of source sediment including a grating 106, a sediment pump 121, a shut-off valve 140, a venturi tube 115 with a sediment inlet and an auger/propeller 116, a water jet 118, and a pipeline 109 for pumping and transporting sediment.

Figure 2:
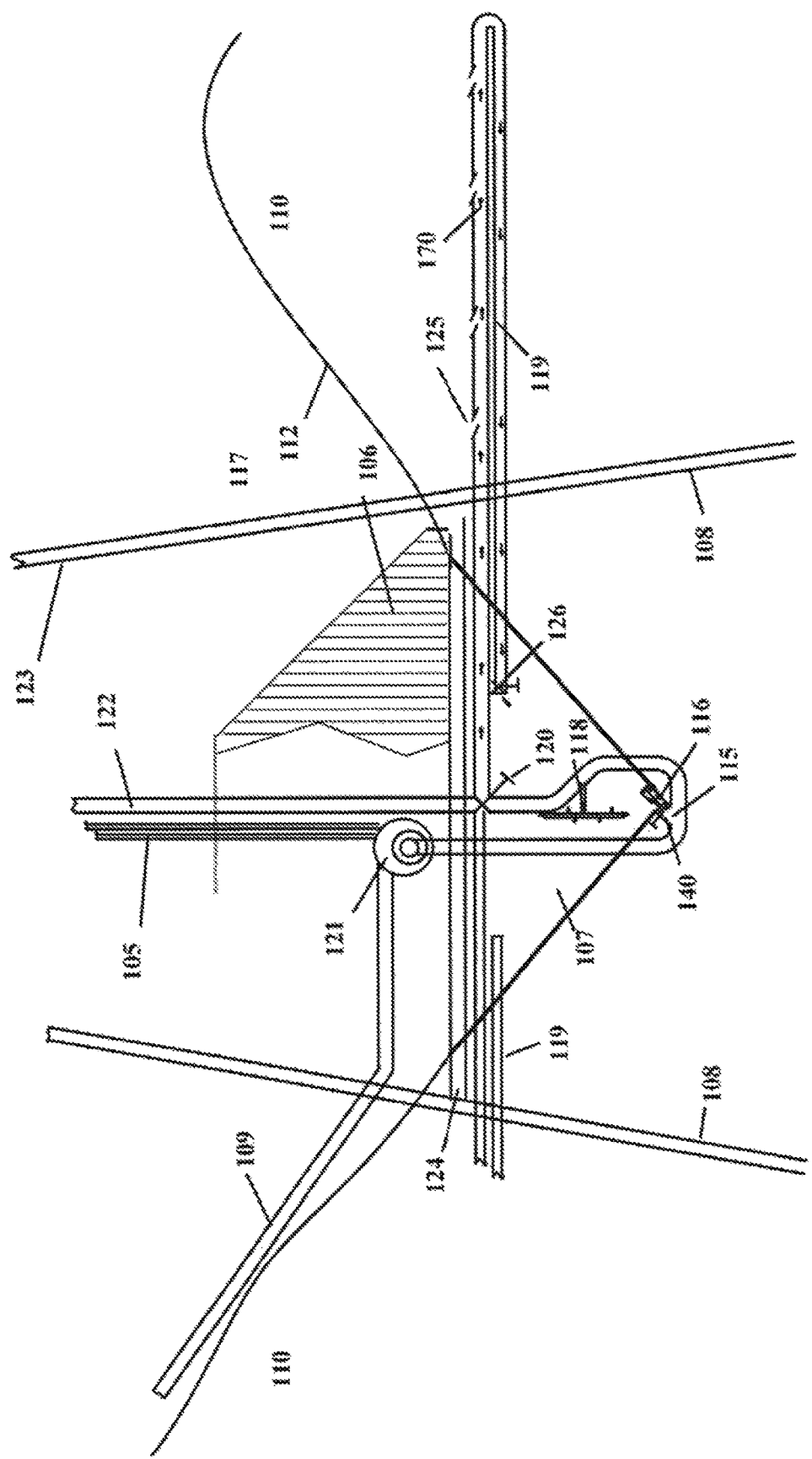
FIG. 2 is a sectional view of an embodiment of the apparatus of the present invention showing the sediment sink with mechanical features.

FIG. 2 is a sectional view of an embodiment showing the apparatus 10 further comprising a sediment conveyor 119 including one or more sediment inlets 125 and a remote controlled pulsing valve 126.

The sediment harvesting platform 101 is fabricated preferably of steel (e.g., welded) and is preferably designed to be high enough above the river surface 102 to prevent flooding and to be hurricane proof.

Alternatively, the platform 101 of any embodiment of the present invention can be made of reinforced concrete, plastic, or composite material.

The platform 101 can extend to a height of 5 to 50 feet high above the river level 102. More preferably, the platform 101 extends to a height of 10 to 30 feet high above the river level 102. Most preferably, the platform 101 extends to a height of 15 to 20 feet high above the river level 102. In various embodiments, the height of the platform 101 is within a range between any two measurements within the above mentioned ranges.

The electrical power supply is preferably connected by overhead wire 103 or by underground cable. The platform 101 preferably includes a shelter 104, which preferably houses mechanical equipment, electrical equipment, electronic controls, etc. The shelter 104 also preferably houses a water pump 180.

Any embodiment of the present invention including parameters such as the dimensions and evacuation rates of the present invention are preferably scalable to the needs of any project. The following ranges are provided as examples only.

The height of the shelter 104 is preferably 6 to 40 feet. More preferably, the height of the shelter is 8 to 30 feet. Most preferably, the height of the shelter is 10 to 20 feet.

The length of the shelter 104 is preferably 10 to 100 feet. More preferably, the length of the shelter is 15 to 80 feet. Most preferably, the length of the shelter is 20 to 30 feet.

The width of the shelter 104 is preferably 10 to 80 feet. More preferably, the width of the shelter is 15 to 80 feet. Most preferably, the width of the shelter is 20 to 30 feet.

In various embodiments, the height, length, and width of the shelter are within a range between any two measurements within the above mentioned ranges.

Below the platform is a sediment sink 107 that can be buried within the natural sediment or sand bar 110 in the river. The sediment sink 107 is preferably made of metal or concrete, with side walls that can be shaped in a configuration of a cone or an inverted pyramid. Alternatively, the sediment sink 107 can have a square or rectangular shape, with side walls in a generally vertical position. The base of the sediment sink 107 can be shaped in a square configuration.

Alternatively, the sink of any embodiment of the present invention can be made of plastic or composite materials.

The sediment sink 107 preferably describes an area where sediment is accumulates, slurried or liquefied, and removed through operation of the apparatus 10.

The sediment sink 107 can include a grating 106 (e.g., steel), which is preferably made of pipes or flat-bars that can cover the top of the sediment sink to prevent debris and obstructions from entering the sink. Alternatively, the grating 106 of any embodiment of the present invention can be made of plastic or composite materials.

Any embodiment of the present invention including parameters such as the dimensions and evacuation rates of the present invention are preferably scalable to needs of any project. The following ranges are provided as examples only.

The depth of the sediment sink is preferably 5 to 150 feet. More preferably, the depth of the sediment sink is 10 to 100 feet. Most preferably, the depth of the sediment sink is 20 to 50 feet. In various embodiments, the depth of the sediment sink is within a range between any two measurements within the above mentioned ranges.

The sediment sink can be positioned at a depth below the river bottom 100 of between about 5 to 150 feet. More preferably, the sediment sink can be positioned at a depth of between about 10 to 100 feet. Most preferably, the sediment sink can be positioned at a depth of between about 20 to 80 feet. In various embodiments, the sediment sink can be positioned at a depth below the river bottom 100 within a range between any two measurements within the above mentioned ranges.

The length of the sediment sink is preferably 10 to 300 feet. More preferably, the length of sediment sink can be 20 to 200 feet. Most preferably, the length of the sediment sink can be 30 to 150 feet. In various embodiments, the length of the sediment sink is within a range between any two measurements within the above mentioned ranges.

The width of the sediment sink can preferably be 10 to 300 feet. More preferably, the width of the sediment sink can be 20 to 200 feet. Most preferably, the width of the sediment sink can be 30 to 150 feet. In various embodiments, the width of the sediment sink is within a range between any two measurements within the above mentioned ranges.

The height of the sediment sink is preferably 3 to 100 feet. More preferably, the height of the sediment sink can be 7 to 70 feet. Most preferably, the height of the sediment sink can be 10 to 50 feet. In various embodiments, the height of the sediment sink is within a range between any two measurements within the above mentioned ranges.

The grating 106 of the sediment sink preferably prevents debris and obstructions of a size greater than 12 inches from entering the sink. More preferably, the grating 106 of the sediment sink prevents debris and obstructions of a size greater than 6 inches from entering the sink. Most preferably, the grating 106 of the sediment sink prevents debris and obstructions of a size greater than 3 inches from entering the sink.

Pilings 108 (e.g., steel) and support structure 124 can preferably be embedded into the riverbed 100 to preferably hold the sink 107 in place and attach the sink 107 to the legs 123 of the platform 101 above. The pilings 108 and support structure 124 can be adapted in any manner to support the apparatus 10.

Alternatively, the pilings 108 and support structure of any embodiment of the present invention can be made of wood, plastic, or composite material.

Any embodiment of the present invention including parameters such as the dimensions and evacuation rates of the present invention are preferably scalable to needs of any project. The following ranges are provided as examples only.

The pilings 108 can have a thickness of between about 4 to 72 inches. More preferably, the pilings 108 can have a thickness of 6 to 48 inches. Most preferably, the pilings 108 can have a thickness of 18 to 36 inches. In various embodiments, the pilings 108 have a thickness within a range between any two measurements within the above mentioned ranges.

The pilings 108 have a preferable length of 10 to 150 feet. More preferably, the pilings 108 have a length of 20 to 100 feet. Most preferably, the pilings 108 have a length of 40 to 80 feet. In various embodiments, the pilings 108 have a length within a range between any two measurements within the above mentioned ranges.

Water lines, hydraulic power lines, and electrical control cables 105 preferably connect the equipment on the platform 101 to the sediment sink 107.

The sediment pipeline 109 preferably transports the sediment slurry from the sediment sink to the shore going over the flood protection levee 114. The sediment harvesting platform can be mounted in the area of a river where sediments naturally accumulate in the sandbar 110. The sediment sink can be placed well below the surface of the sandbar, 110 giving the overall depth 111 of the sediment pit 117.

A sediment pit 117 is preferably formed via operation of the apparatus 10, where sediment from a portion of the river bottom 100 is preferably removed. The sediment pit 117 is preferably defined by sediment sink 107 and a cavity 151 formed by removal of sediment. The removal of the sediment by apparatus 10 preferably reduces the height of the portion of the river bottom 100 such that the cavity 151 is formed. Sediment located within the sediment sink 107 is preferably removed by the apparatus 10 and leaves an empty space within the sediment sink 107. As sediment is removed, the empty space is preferably filled by sediment above the sediment sink 107. The movement of the sediment above the sediment sink 107 into the sediment sink 107 may be due to, for example, gravity and the weight of the sediment or suction created by the apparatus 10.

The depth of the sediment pit 117 can be preferably 10 to 300 feet. More preferably, the depth of the sediment pit 117 can be 20 to 200 feet. Most preferably, the depth of the sediment pit 117 can be 40 to 160 feet. In various embodiments, the depth of the sediment pit is within a range between any two measurements within the above mentioned ranges.

The cavity 151 above the sediment sink 107 that can be open to the river channel 152 and can have a width 113 determined by the slope of the sediment pit wall, 112. Preferably, the general capacity of the sediment sink is directly proportional to the open area in the sandbar that the sediment pit forms.

The width 113 of the sediment pit 117 is preferably 20 to 600 feet. More preferably, the width 113 of the sediment pit can be 40 to 400 feet. Most preferably, the width 113 of the sediment pit 117 can be 80 to 300 feet. In various embodiments, the width of the sediment pit is within a range between any two measurements within the above mentioned ranges.

In the sediment sink 107, sediment is preferably slurried or liquefied and fed into the suction side of the sediment pump 121. The water supply 122 for the sediment sink 107 is preferably provided from the platform 101 near the river surface 102, where the water is cleaner. The outflow from the sediment pump 121 is preferably placed into the outflow pipeline 109.

The sediment pump 121 preferably can have an output pressure of between about 5 to 100 psi (pounds per square inch). More preferably, the sediment pump 121 can have an output pressure of 10 to 80 psi. Most preferably, the sediment pump 121 can have an output pressure of 20 to 60 psi. In various embodiments, the sediment pump 121 has an output pressure within a range between any two measurements within the above mentioned ranges.

The diameter of the outflow pipeline 109 can be between about 3 to 36 inches. More preferably, the diameter of the outflow pipeline 109 can be between about 4 to 24 inches. Most preferably, the diameter of the outflow pipeline 109 can be between about 6 to 18 inches. In various embodiments, the diameter of the outflow pipeline 109 is within a range between any two measurements within the above mentioned ranges.

As shown in FIGS. 1 and 2, the water pump located in shelter 104 pumps clean water into the water suction supply (e.g., pipe) 122 that is connected to the flow control valve 120. The flow control valve 120 is operatively connected to the sediment conveyors 119 and at least one pipe 190 connected to the sediment pump 121 that also includes the water jets 118, venturi tube 115 with a sediment inlet, and auger/propeller 116 and preferably controls the flow of clean water from the water suction supply 122 to the sediment conveyors 119 and the at least one pipe. The flow control valve 120 can preferably vary the flow of clean water in a manner such that 0 to 100% of the clean water can be directed to the sediment conveyors 119 and the at least one pipe 190.

The at least one pipe 190 connected to the sediment pump 121 that also includes the water jets 118, venturi tube 115 with a sediment inlet, and auger/propeller 116 is preferably sized and shaped such that the venturi tube 115 with a sediment inlet and auger/propeller 116 are positioned generally at the bottom of the sediment sink 107 and the water jets 118 are positioned above the sediment inlet.

Clean water flowing through the at least one pipe 190 preferably flows through the venturi tube 115 and creates vacuum that induces sediment to flow through the sediment inlet. The clean water flowing through the at least one pipe can also feed water to the water jets 118 that preferably slurries or liquefies the sediment. The auger/propeller 116 also serves to aid in moving sediment into the venturi tube 115. Thus, the combination of the venturi effect, mechanical motion, and gravity move sediment from the sediment pit and into the venturi tube 115.

The ratio of sediment to water that allows for flow through into the sediment inlet preferably ranges from $\frac{1}{20}$ to $\frac{1}{2}$. More preferably, the ratio of sediment to water that allows for flow through into the sediment inlet ranges from $\frac{1}{10}$ to $\frac{2}{5}$. Most preferably, the ratio of sediment to water that allows for flow through into the sediment inlet ranges from $\frac{1}{6}$ to $\frac{1}{3}$. In one embodiment, the ratio of sediment to water that allows for flow through into the sediment inlet ranges $\frac{1}{90}$ to $\frac{3}{7}$. In various embodiments, the ratio of sediment to water is within a range between any two measurements within the above mentioned ranges.

When water circulation is started through the sediment pump 121, a venturi tube 115 with a sediment inlet, preferably located at the bottom of the sediment sink inlet, can create suction and slurries or liquefies sediment at the bottom of the sink. A powered (e.g., hydraulic) auger/propeller 116 can be located adjacent to or within the throat of the sediment inlet of the venturi tube 115 and can be activated to help move sediment into the venturi tube 115 and to break up any clumps or debris. In one embodiment, the auger/propeller 116 is powered electrically. The shut-off valve 140 is preferably closed when not pumping in order to prevent sand or sediment from blocking the pipes.

When water circulation is established via supply 122 and the sediment within the sediment sink 107, is slurried and the flow control valve 120 can shut off the flow of clean water to the at least one pipe 190. When this occurs, the sediment pump 121 can be used to remove sediment from the sediment sink 107.

The water pump 180 is preferably of a type of pump preferably providing sufficient torque for moving clean water from a water source 102, to and through the water suction supply 122, and through either the at least one pipe 190 or sediment conveyor 119. The water pump 180 can be, for example, a centrifugal pump or positive displacement pumps.

The water pump 180 preferably has a flow rate of 200 to 10,000 gallon per minute (gpm). More preferably, the water pump 180 has a flow rate of 500 to 7500 gpm. Most preferably, the water pump 180 has flow rate of 1000 to 6000 gpm. In various embodiments, the water pump 180 preferably has a flow rate within a range between any two measurements within the above mentioned ranges.

Any embodiment of the present invention including parameters such as the dimensions and evacuation rates of the present invention are preferably scalable to needs of any project. The following ranges are provided as examples only.

The diameter of the venturi tube 115 is preferably 2 to 30 inches. More preferably, the diameter of the venturi tube 115 can be 4 to 20 inches. Most preferably, the diameter of the venturi 1 tube 15 can be 6 to 18 inches. In various embodiments, the diameter of the venturi tube 115 is within a range between any two measurements within the above mentioned ranges.

The diameter of the auger/propeller 116 is preferably 2 to 30 inches. More preferably, the diameter of the auger/propeller 116 can be between about 4 to 20 inches. Most preferably, the diameter of the auger/propeller 116 can be between about 6 to 18 inches. In various embodiments, the diameter of the auger/propeller 116 is within a range between any two measurements within the above mentioned ranges.

An array of water jets 118 can be mounted slightly above the sediment inlet throat and preferably supplies the inlet with pressurized water from a pump mounted on the platform. The water jets 118 preferably create a circular flow wherein sediment in the sediment sink 107 is suspended in clean water for slurrying or liquefaction. When required, the water jets can help slurry or liquefy the sediment that is compacted and not flowing sufficiently into the throat of the sediment inlet of the venturi tube 115.

The water jets 118 preferably have an output pressure of between about 30 to 500 psi. More preferably, the water jets 118 have an output pressure of 50 to 300 psi. Most preferably, water jets 118 have an output pressure of 60 to 250 psi. In various embodiments, water jets 118 have an output pressure is within a range between any two measurements within the above mentioned ranges.

In one embodiment, there is only one water jet.

In one embodiment, the water jets 118 emits water at a pressure similar to a pressure used in water injection dredging processes such that the sediment is suspended in water.

In one embodiment, the water jets 118 emits water at a pressure similar to a pressure used in agitation dredging.

In one embodiment, the apparatus 10 incorporates electrically or hydraulically driven vibrating mechanisms that will slurry or liquefy sediment flowing into the inlet.

Main flow control valve 120 preferably regulates how much clean water is fed into the suction side of the sediment pump 121, preferably controlling the suction pressure and flow through the sediment inlet of the venturi tube 115. The main flow control valve 120, for example, can be a multiple output valve such as a three-way valve. The slurried or liquefied sediment can be drawn into the suction side of the sediment pump 121 and pressurized for transport through the outflow pipeline 109. In one embodiment the sediment pump 121 is a centrifugal design. In one embodiment the sediment pump 121 is a positive displacement design.

In one embodiment, the sediment pump 121 is mounted underwater above the sediment sink 107 or on the platform 101 depending on the pumping requirements for the particular location.

The sediment pump 121 is preferably of a type of pump preferably providing sufficient torque for moving a combination of water and sediment from the venturi tube 115 and through the pipeline 121. The sediment pump 121 can be, for example, a centrifugal pump or positive displacement pumps.

The sediment pump 121 preferably has a flow rate of 50 to 5000 gpm. More preferably, the sediment pump 121 has a flow rate of 175 to 3500 gpm. Most preferably, the sediment pump 121 has flow rate of 350 to 2500 gpm. In various embodiments, the sediment pump 121 has a flow rate within a range between any two measurements within the above mentioned ranges.

The sediment pump 121 preferably has an excavation rate of 3 to 300 cubic yards per hour. More preferably, the sediment pump 121 has an excavation rate of 10 to 200 cubic yards per hour. Most preferably, the sediment pump 121 has an excavation rate of 20 to 150 cubic yards per hour. In various embodiments, the sediment pump 121 has an excavation rate within a range between any two measurements within the above mentioned ranges.

In one embodiment, the apparatus 10 uses a two stage pumping process to preferably create more pressure to move the slurried or liquefied sediment longer distances in the outflow pipeline 109. In this embodiment, the sediment pump 121 feeds into a secondary booster pump mounted on the platform. In this embodiment, both pumps supply the outflow pipeline 109.

Any embodiment of the present invention including parameters such as the dimensions and evacuation rates of the present invention are preferably scalable to needs of any project. The following ranges are provided as examples only.

The secondary booster pump preferably has a flow rate of 50 to 5000 gpm. More preferably, the secondary booster pump has a flow rate of 175 to 3500 gpm. Most preferably, the secondary booster pump has flow rate of 350 to 2500 gpm. In various embodiments, the secondary booster pump has a flow rate within a range between any two measurements within the above mentioned ranges.

The secondary booster pump preferably has an output pressure of 10 to 200 psi. More preferably, the secondary booster pump has an output pressure of 20 to 160 psi. Most preferably, the secondary booster pump has an output pressure of 40 to 120 psi. In various embodiments, the secondary booster pump has an output pressure within a range between any two measurements within the above mentioned ranges.

Any pump used in an apparatus of any embodiment may be a reversible pump.

One embodiment of the present invention includes redundancies into the apparatus 10 preferably restarting sediment flow even under worst-case conditions such as when the sediments are caked and compacted. The hydraulic powered auger 116 and pressurized water jets 118 preferably ensure that sediment flow can be restarted even with sediment clumping and external debris that may be unavoidable in normal conditions, as may happen when the system is shut down for a while. Mechanical components that are subject to wear and failure are preferably designed to be accessible from above the sediment sink so that they can be changed out when necessary.

One embodiment of the present invention includes sensors preferably mounted within the apparatus 10 to preferably monitor important parameters in real time and send the measurements into a programmable logic controller (PLC) that will preferably control the operation of the apparatus 10. Sensors may include, but are not limited to: water flow sensor, sediment flow sensor, depth of sediment, depth of water, liquid pressure at sediment inlet of the venturi tube 115, liquid pressure within pipeline, water supply pressure, pump revolutions per minute (rpm), hydraulic system pressures, and water to sediment ratios. The microprocessor control will preferably activate sediment harvesting automatically when sediment is available; otherwise it can preferably remain passively inactive. The PLC can preferably vary the extent of the operation of the apparatus 10 relative to the monitoring parameters. For example, the PLC may employ a method of removing sediment from a sediment pit comprising the steps of monitoring the parameters/ conditions of the sediment pit with sensors and determining sediment needs to be removed; engaging a water pump when sediment needs to be removed to pump water from a water source upstream of the water pump to water supply connected to the water pump upstream and at least one sediment conveyor having inlets and a pulsating valve and at least one pipe (add reference number) including water jets, venturi tube including a sediment inlet, and auger/proper downstream; regulating the flow of water from the water supply with a flow control valve between the at least one sediment conveyor or the at least one pipe; using the sediment conveyor to input sediment into the sediment pit; using the water jets and auger/proper to suspend sediment in water;

determining whether sediment is flowing through the sediment inlet; using the flow control valve to prevent water flow to the at least one pipe and disengaging the water pump; engaging a sediment pump connected downstream to the at least one pipe such that sediment continues to flow through the sediment inlet wherein the sediment pump pumps sediment to a sediment pipeline connected to the sediment pump upstream; and monitoring the conditions/parameters of the sediment pit such that the sediment pump may be disengaged when the sediment has been removed from the sediment pit. It also anticipated that the example method performed by the PLC can also be manually accomplished.

One embodiment of the present invention after the sensors indicate that the central sediment pit above the sink has been relatively cleared, water pumped from the platform will be preferably fed through the main flow control valve 120 and to the sediment conveyors 119. The conveyors 119 preferably extend outward radially from the sediment pit.

In one embodiment of the present invention, the apparatus 10 preferably comprises four sediment conveyors 119 preferably one on each side of the square base of the sediment sink 107. The sediment conveyors 119 preferably comprise sediment inlets 125 that can draw sediments into the water flow by venturi effect and can deposit the slurried or liquefied sediment into the sediment pit.

The sediment conveyors 119 are preferably include pipe or tubing having outer surface, inner surface, and a bore that are connected to the water supply 122 at a first end. The sediment conveyors 119 preferably extend through the sediment pit wall 112 and into the sandbar 110. In a more preferred embodiment, the sediment conveyors 119 are preferably folded onto itself such that the second or discharging end of sediment conveyors 119 is positioned within the sediment pit 117.

In one embodiment, the apparatus 10 may include up to four sediment conveyors 119. Also, the flow control valve 120 can preferably regulate and vary the flow of water from the water supply 122 to each sediment conveyor 119.

Any embodiment of the present invention including parameters such as the dimensions and evacuation rates of the present invention are preferably scalable to needs of any project. The following ranges are provided as examples only.

The length of the sediment conveyor 119 is preferably 10 to 300 feet. More preferably, the length of the sediment conveyors 119 can be 20 to 200 feet. Most preferably, the length of the sediment conveyors 119 can be 30 to 150 feet. In various embodiments, the length of the sediment conveyor 119 is within the above mentioned ranges.

The diameter of the sediment conveyor 119 is preferably 3 to 36 inches. More preferably, the diameter of the sediment conveyor 119 can be 4 to 24 inches. Most preferably, the diameter of the sediment conveyor 119 can be 6 to 18 inches. In various embodiments, the diameter of the sediment conveyor 119 is within the above mentioned ranges.

In one embodiment of the present invention, a discharge end of the sediment conveyor 119 is preferably fitted with a remote controlled pulsing valve 126. The remote controlled pulsing valve 126 is preferably closed to create a pulse of reverse pressure on a timed interval basis. The pulsed water pressure momentarily reverses the flow through the sediment inlets thereby helping to breakup compacted sediments and to slurry or liquefy the sediments to preferably ensure that the sediment inlets 125 remain clear and allow sediment to flow.

In various embodiment, the sediment conveyors 119 have a plurality of inlets 125 that are spaced throughout the sediment conveyor 119.

The diameter of inlets 125 is preferably ½ to 9 inches. More preferably, the diameter of the inlets 125 can be ¾ to 6 inches. Most preferably, the diameter of inlets 125 can be 1 to 4 inches. In various embodiments, the diameter of the inlets 125 is within the above mentioned ranges.

The sediment conveyors 119 may also further include baffles preferably extending from the inner surface into the bore of the sediment conveyors 119. More preferably, the baffles extend from the inner surface of the conveyors adjacent to the inlets. The baffles may be angled such that the baffles extend under the inlet where sediment flow is directed by the baffles. In one embodiment, the baffles comprise a first portion generally extending vertically, which is attached to the inner surface of the sediment conveyor on a fust edge, and a second portion generally extending horizontally that is attached to a second edge of the first portion. The inclusion of the baffles help to created suction of the sediment by the venturi effect.

Figure 3:
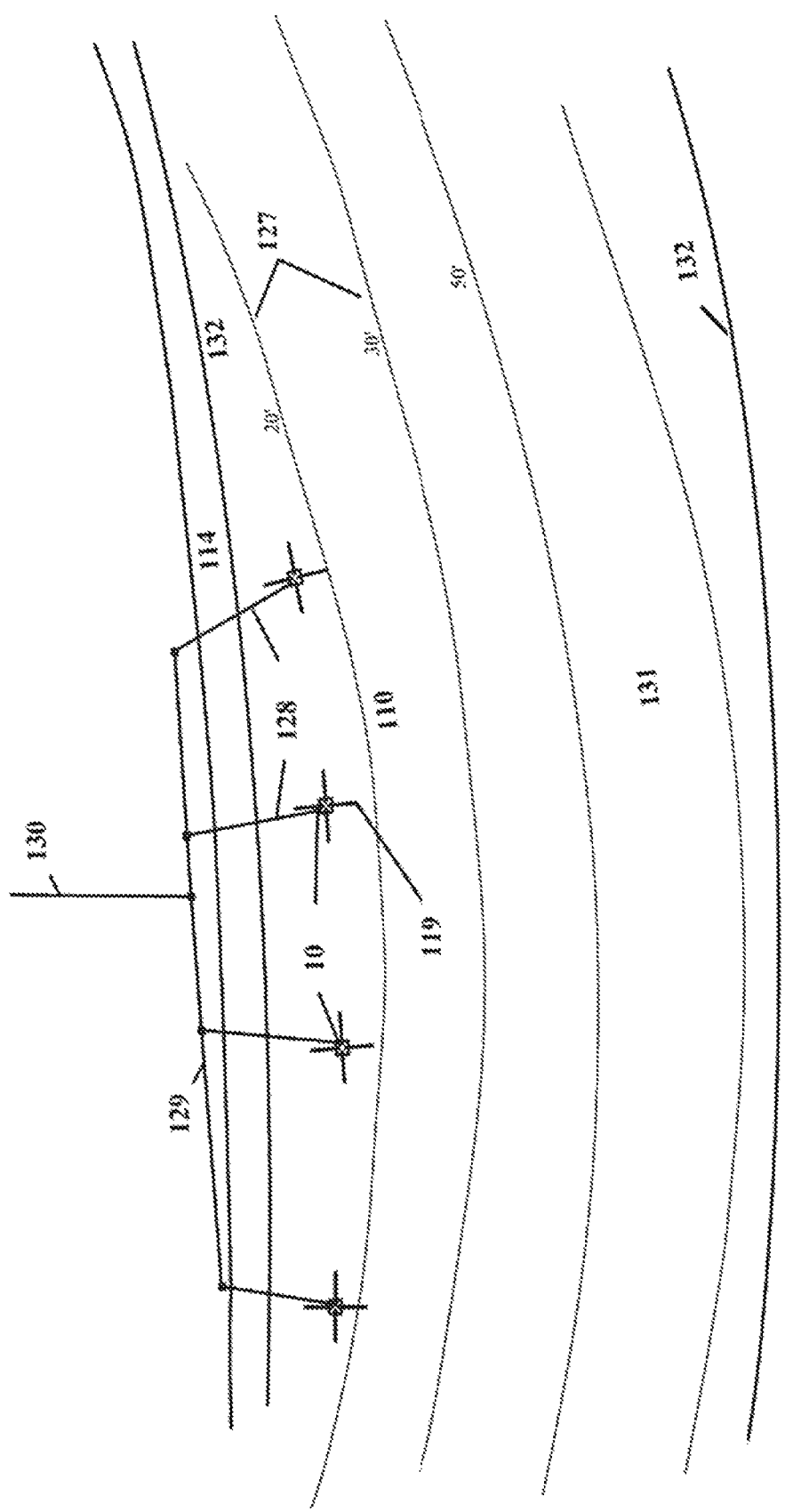
FIG. 3 is a top view of an embodiment of the system of the present invention showing a section of river with an array of four sediment harvesting platforms connected in parallel to a sediment delivery pipeline.

One embodiment of the invention includes a system 1000 (see FIG. 3) and method for the deploying the apparatuses 10 of the present invention preferably in series, wherein the sediment harvesting platforms 101 are preferably and strategically placed in the river bed 100 within the natural sand bars 110 outside of the traditional river navigational channel 131, as depicted in FIG. 3. An array of four sediment harvesting platforms 101 are preferably placed in a sandbar 110. The sediment conveyors 119 preferably extend the capacity of each platform. The sediment feeders 128 are preferably the outflow lines that carry sediment to the shore where they can be connected to a manifold 129 that can connect to the sediment delivery pipeline 130.

In one embodiment of the present invention, existing shore-side electrical power preferably supplies power to the platform 101 to run the hydraulic system, controls and pumps in areas where the apparatus 10 is close to the river banks.

In one embodiment, four or more sediments sinks in a parallel configuration preferably provide more material over a larger time span to the sediment delivery pipeline. This preferably increases economic efficiency of the sediment delivery project.

The removal of sediment through the sink will preferably increase water depth at that location. Using the USACE report about sedimentation rates in the lower Mississippi River suggesting that approximately 80% of the main sediments removed from a burrow (dredged) area are replenished by the river in one year's time, the annual capacity of the sediment harvesting platform can be approximated by taking 80% of the sediment pit volume combined with the volume of the pits created by the sediment conveyors.

The deployment of sediment harvesting platforms in a river bed preferably increases the average effective depth in that section of the river, creating an increase of the transverse sectional area of the river channel 152 and therefore a proportionate decrease in the flow velocity in that section of the river. When water velocity decreases, the ability to carry suspended sediment also decreases; this causes sediment to fall to the bottom. By strategically placing the sediment harvesting platforms in an extended length of the river, theoretically engineers will have a tool that will enable them to design a system to control sediment flow in the river. With these tools, engineers will be able to design a system that greatly increases the supply of sediments available for harvesting for restoration purposes, while reducing sedimentation at the lower end of the river, near the passes where shoaling is prevalent, which, in turn, would save tremendously on dredging cost there.

Figure 4:
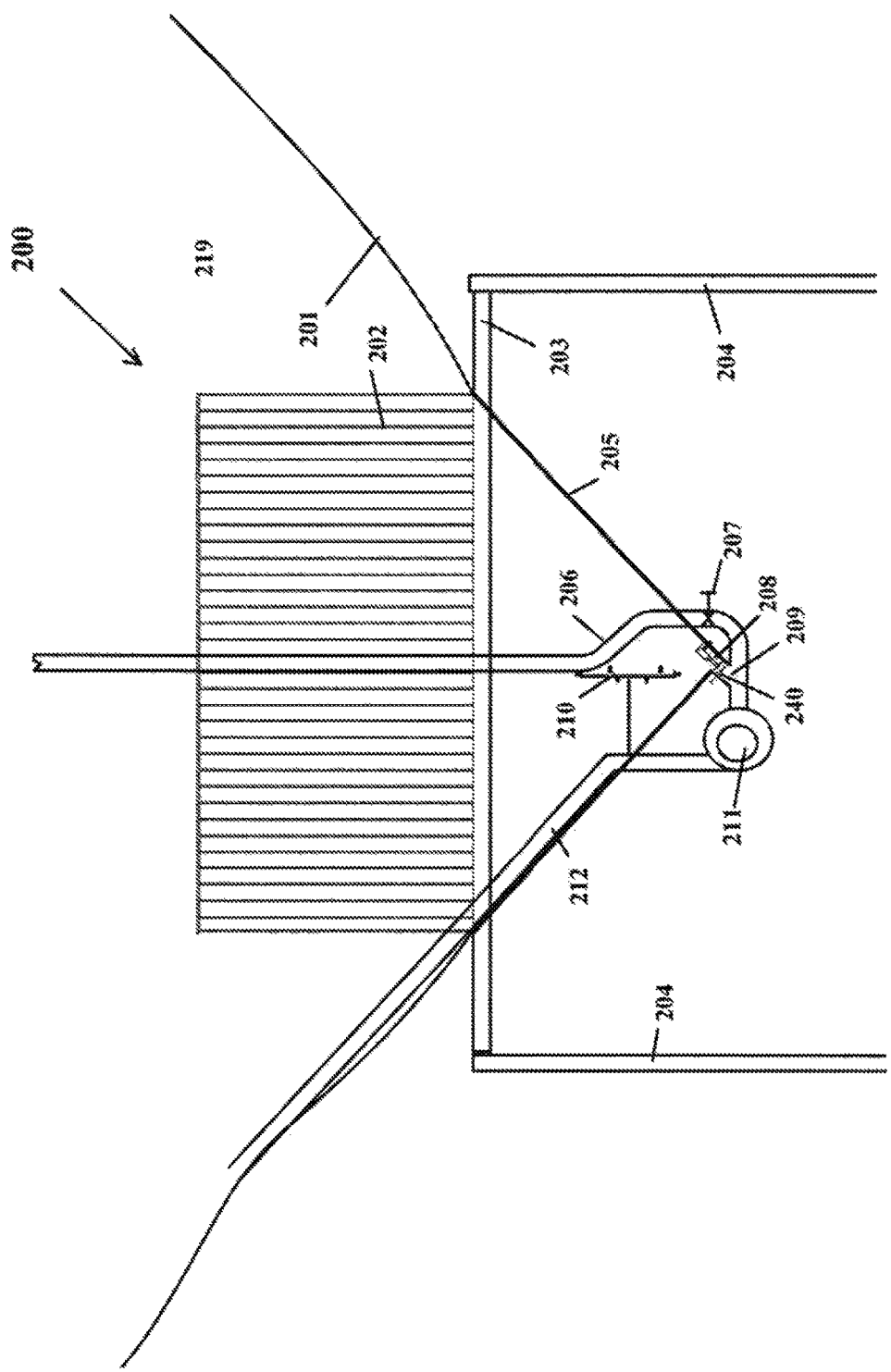
FIG. 4 is a sectional view of an embodiment of the apparatus of the present invention showing the sediment sink.
Figure 5:
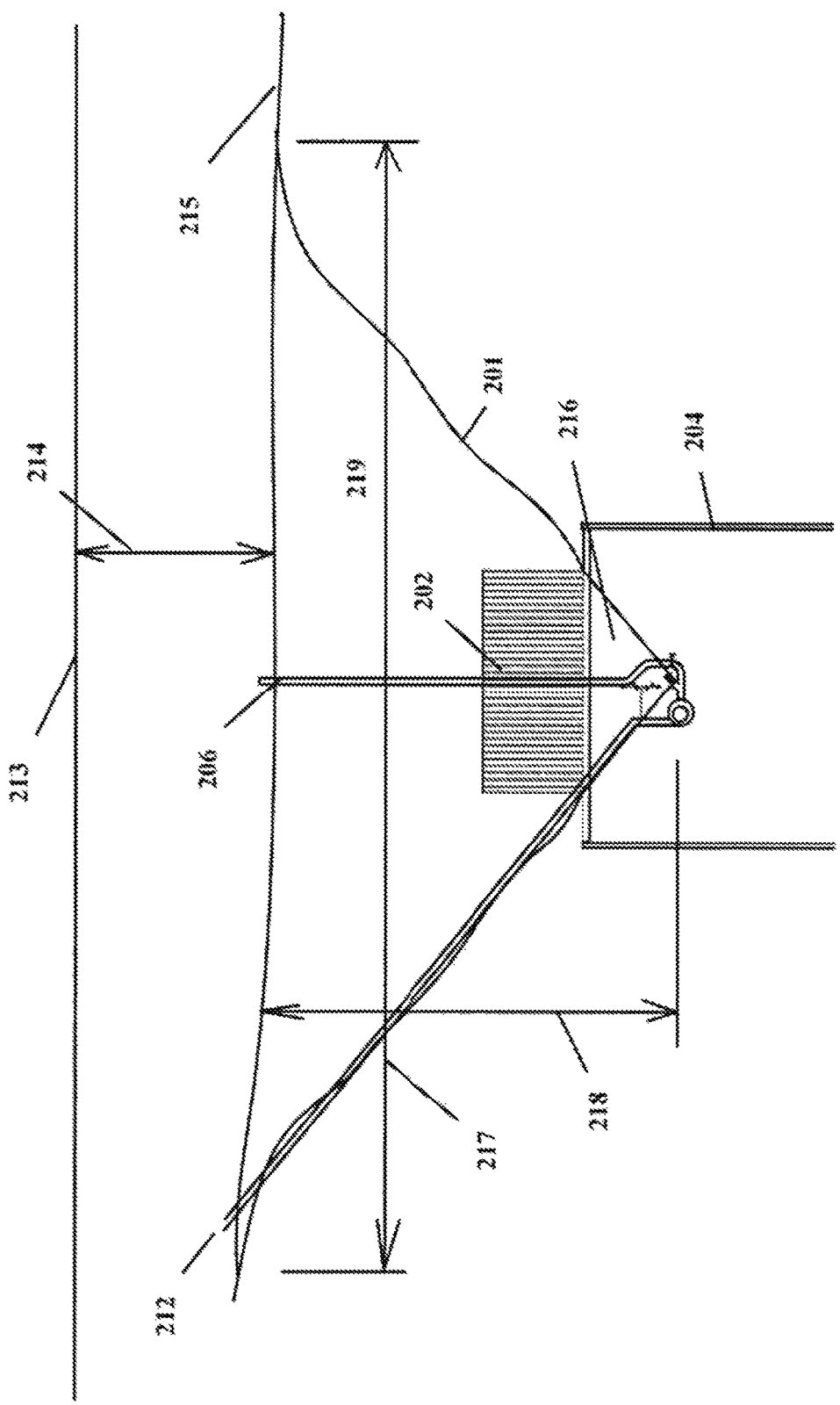
FIG. 5 is a side view of an embodiment of the apparatus of the present invention of a sediment sink.

FIGS. 4 and 5 shows an alternative embodiment of the present invention of an apparatus 200 comprising a suction inlet and sediment sink without a connected platform above. In one embodiment, one or more apparatuses 200 can be remotely connected to control eight pumping platforms located away from the sediment sink. In an embodiment of the present invention, the apparatus 200 may draw sediment, material, etc. into a pipeline 212 in a fluid state. The apparatus 200 of an embodiment of the present invention can be a mechanical element, which may be mounted in a fixed position below a source of sediment or granular material, for the purpose of evacuating the material by carrying it within a liquid (e.g. water) via a pipeline. The apparatus 200 of an embodiment of the present invention can be positioned well below the level of the source sediment or granular material so that the material, which is in the proximity of the inlet, can flow downward toward the inlet aided by gravity. The apparatus 200 of an embodiment of the present invention may be held in a fixed position by a structure under the normal surface of the sediment. For example in a river, the sediment inlet can be held by pilings driven into the seabed well below the elevation of the suction inlet. The properties of the apparatus 200 of this embodiment allow for deployment of a fixed system within rivers and water streams that can harvest sediment more efficiently, and have better control of sedimentation than existing methods.

FIG. 4 depicts a side view of the sediment sink of an alternative embodiment. The side walls 205 of one embodiment of the present invention may be shaped in the configuration of a cone or an inverted pyramid. Alternatively, the sink can have a square or rectangular shape, with side walls 205 placed in a generally vertical position. Steel grating 202 of one embodiment of the present invention may be made of pipe or flat-bar covers the top of the sediment sink in order to prevent debris and obstructions from entering the sink. Alternatively, the grating of embodiment of the present invention can be made of plastic or composite material.

Pilings (e.g., steel) 204 and support structure of this embodiment may be embedded into the riverbed to provide attachment to hold the sink in place.

Alternatively, the pilings 204 and support structure of any embodiment of the present invention can be made of wood, plastic, or composite material.

The water suction supply 206 piping of one embodiment of the present invention may be mounted above the sediment sink to be able to draw "cleaner" water from above the normal river bed surface, or alternatively the suction supply pipe 206 may be routed alongside the outflow pipe with the clean water inlet at a location closer to the bank for better accessibility.

The water supply 206 may be attached to the sediment pump suction. Outflow from the sediment pump 211 may be put into the outflow pipeline 212. When water circulation is started through the sediment pump 211, venturi tube 209 at the bottom of the sediment sink inlet may create suction through the sediment inlet of the venturi tube 209 and begins to slurry or liquefy sediment at the bottom of the sink. In the throat of the sediment inlet there may be a hydraulic powered auger/propeller 208 that is activated to move sediment into the venturi tube 209. The shut-off valve 140 is preferably closed when not pumping in order to prevent sand or sediment from blocking the pipes.

Mounted slightly above the sediment inlet throat may be an array of water jets 210 with a water supply 206 from the pressured outflow of the sediment pump 211. The water jets 210 may be activated, when required, to help slurry or liquefy the sediment in cases where the sediment is compacted and not flowing sufficiently into the throat. With water flow established providing suction at the venturi tube 209, and the sediment being slurried or liquefied at the bottom of the sink sediment is being drawn into the suction side of the sediment pump 211. As the sediment is drawn out of the bottom of the sediment sink, a cavity 251 may be formed of water and slurried or liquefied sediment and sediment above and around the cavity 251 is drawn into the slurry, and by gravity led into the throat.

FIG. 5 depicts the sediment sink 216 mounted in the bottom of a river bed relative to the river surface and normal river bottom of an alternative embodiment. The water supply pipe 206 may be mounted to be able to draw water unobstructed. As the sediment sink 216 evacuates sediment from the bottom, sediment may be drawn downward by gravity and water currents. Eventually, a sediment pit may be formed that opens up to the river bottom.

In one embodiment, the slope of the sediment pit wall may be dependent on the type of sediment and the amount of water current in the pit. When the pit is opened to the river bed, controls may measure the sediment depth in the sink in real time can be used to activate the sediment pump and etc. as needed.

The apparatus of one embodiment of the present invention is a sediment suction inlet that is designed to be self-starting. Should it become inundated and compacted with sediment to a degree that sediment flow is halted, for example, after being shut down for a while, it may restart the sediment flow automatically. This may be done by incorporating a "clean" water inlet 206 to create independent water circulation below the inlet, and to supply the water jets with pressurized water. The water jets 210 may slurry or liquefy the sediment to help restart the sediment flow into the throat. With water circulating in the venturi tube 209, a vacuum may be created that draws slurried or liquefied sediment through the sediment inlet of the venturi tube 209 and into the pipeline 212. The hydraulically powered auger in the inlet further aids in moving sediment into the water stream. The apparatus 200 may also incorporate electrically or hydraulically driven vibrating mechanisms that will be used to help slurry or liquefy the sediment flowing into the inlet.

The apparatus 200 may also incorporate an electrically or hydraulically driven pump that may force slurried or liquefied material down the pipeline 212 toward its intended destination. In one embodiment of the present invention, the clean water inlet may include a remotely controlled valve 207 to adjust the flow of clean water entering at the bottom of the inlet thereby controlling the amount of suction and flow at the venturi tube 209 and through the sediment inlet of the venturi tube 209.

In one embodiment of the present invention, the apparatus may incorporate sensors mounted within it to monitor important parameters in real time and send the measurements into a programmable logic controller (PLC) that will control the operation of the apparatus. Sensors may include, but are not limited to: water flow sensor, sediment flow sensor, depth of sediment, depth of water, liquid pressure at the sediment inlet of the venturi tube 209, liquid pressure within pipeline, water supply pressure, pump rpm, hydraulic system pressures. The PLC can preferably vary the extent of the operation of the apparatus 200 relative to the monitoring parameters. For example, the PLC may employ a method of removing sediment from a sediment pit at the bottom of a water source with an apparatus including: a frame incorporated within a sand bar and positioned over at least a portion of the sediment pit; a grating positioned on the top surface of the frame that extends along the diameter of the at least a portion of the sediment pit; at least one pipe having a water inlet positioned above the grating where the at least one pipe extends through the grating, a venturi tube with a sediment inlet, shut-off valve, and auger/propeller positioned generally at the bottom of the sediment pit, and a flow control valve positioned upstream of the venturi tube; a sediment pump positioned below the grating and downstream of the at least one pipe, a pipeline positioned downstream of the sediment pump; and water jets extending from the pipeline and positioned above the sediment inlet. The example method using the previously described apparatus comprises the steps of monitoring the parameters/conditions of the sediment pit with sensors including the ratio of sediment to water and determining sediment needs to be removed; closing the shut-off valve if the sediment to water ratio is greater than 3:10; engaging the sediment pump wherein water from the water source enters the at least one pipe and flows through into the pipeline; slurrying or liquefying the sediment with water flow from the pipeline and expelled into the sediment pit through the jets such that the sediment to water ratio is at least 3:10; opening the shut-off valve and closing the flow control valve; and pumping the sediment from the sediment pit. It also anticipated that the example method performed by the PLC can also be manually accomplished.

In one embodiment, the suction inlet sediment sink apparatus 200 may be designed with a grating 202 to prevent debris from entering the sediment inlet and to be easily cleaned of any debris and foreign objects when necessary.

In one embodiment, the apparatus 200 may further include sediment conveyors as previously described.

Figure 6:
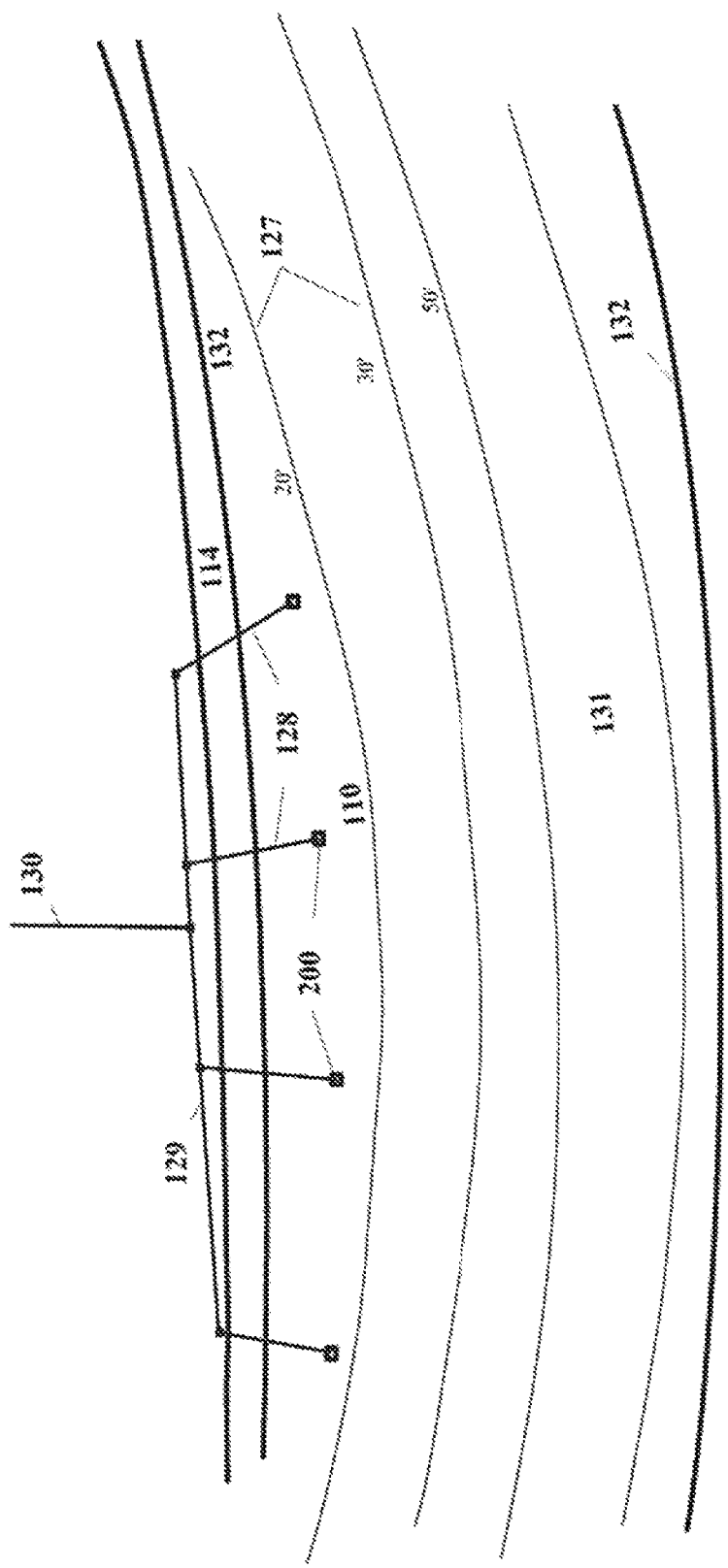
FIG. 6 is a top view of an embodiment of the system of the present invention showing a section of river with an array of four sediment harvesting platforms connected in parallel to a sediment delivery pipeline.

One embodiment of the invention includes a system 1200 (FIG. 6) and method for the deploying the apparatuses 200 in series, wherein the sediment pits 219 are strategically placed in a river bed within the natural sand bars, outside of the traditional river navigational channel as shown in FIG. 6. In areas where the sand bars are close to the existing river levee electrical power can be easily supplied to the sediment sink(s) to run the hydraulic system, controls and pumps. In those cases, control systems and booster pumps for the sediment sinks of various embodiments can be located shoreside while connected to the sediment sinks in the river. Having three or four sediments sinks configured in parallel will provide more material over a larger time span to the sediment delivery pipeline. This will increase economic efficiency of the sediment delivery project.

A river sediment control design may be achieved by placing an array of sediment sinks within a close proximity to each other. The removal of sediment through the sink will cause increased water depth at that location. The increased depth created by the sinks will increase the transverse area of the river channel 252, thereby decreasing the flow velocity. When water velocity decreases, the ability to carry suspended sediment also decreases; this causes sediment to fall to the bottom. By strategically placing the sinks in an extended length of the river, engineers will be able to control sediment flow in the river, and have a greater amount of natural supply of sediments available for harvesting for restoration purposes. That also opens the possibility to reduce sedimentation at the lower end of the river, near the passes where shoaling is prevalent, which, in turn, would save tremendously on dredging cost there.

Figure 7:
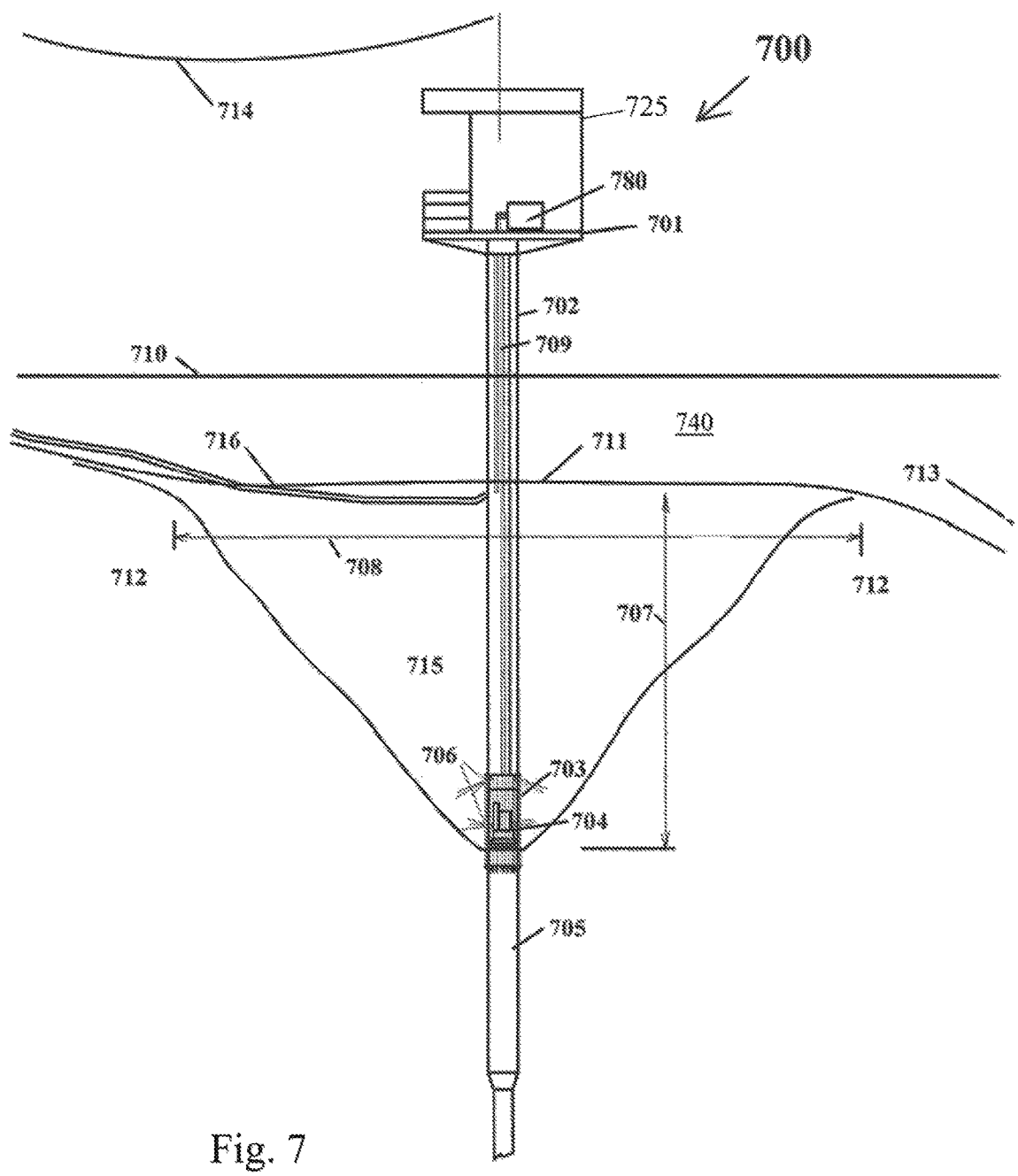
FIG. 7 is a side view of a preferred embodiment of the apparatus of the present invention of a sediment harvesting sink with a platform installed in a layer of sediment in a cross-section of a river, wherein the sink is in the form of a cylindrical tube, such as a large diameter pipe, or a built up caisson that is driven into the bottom of the waterway.

FIG. 7 depicts a side view of a preferred embodiment of the apparatus 700 of the present invention of a sediment harvesting sink with platform 701 installed in a layer of sediment 712 in a cross-section of a river or waterway 740.

Figure 8:
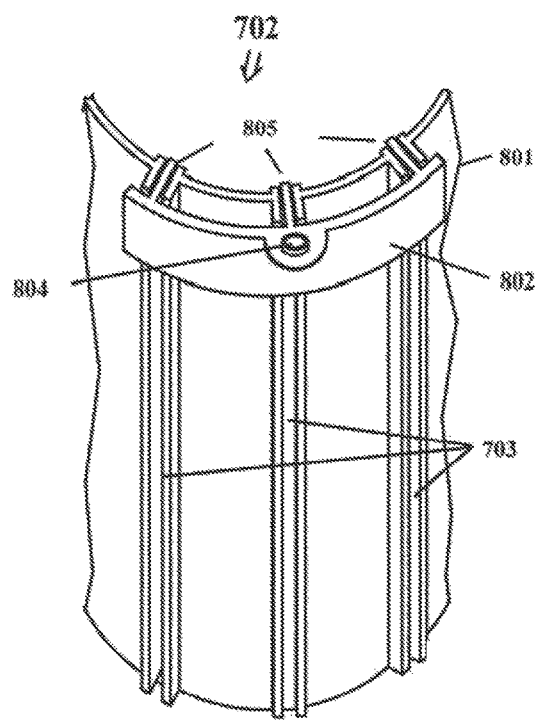
FIG. 8 is a partial perspective view of an embodiment of the apparatus of the present invention showing a means for cleaning debris surrounding the central vessel and keeping the vents clear.

The apparatus 700 for removing sediment 712 from waterway bottoms 711 comprises a sediment harvesting platform 701 preferably positioned a distance above a water surface 710 and a central vessel 702. The platform 701 preferably comprises a shelter 725 and a means for receiving electricity such as an electrical power supply 714. The central vessel 702 preferably further comprises a means for slurrying or liquefying sediment, a means for filtering the slurried or liquefied sediment, and a means for removing the slurried or liquefied sediment. The apparatus of this embodiment preferably further comprises a means for positioning and stabilizing the apparatus on a water bottom 711. The apparatus of this embodiment may also include a means for cleaning debris surrounding the central vessel, as seen in FIG. 8.

This embodiment includes a design of a sediment harvesting apparatus 700 that has a central large diameter pipe or enclosed steel casing 702 that extends along a depth 707 within the sediment layer 712 in the waterway bottom 711 to above the waterway surface 710 of the waterway 740.

In this embodiment, the large diameter pipe or built up steel casing preferably serves as a vessel 702 which can be driven deep into the sediment layer 712. Vents 703 preferably on the outside wall on the lower end of the pipe or casing 702 preferably assist and allow sediment to flow into the vessel 702 to sediment pump 704 placed within the vessel 702. On the lower extremity of the steel vessel 702 there is preferably a steel piling 705 to anchor the sediment harvesting apparatus 700 in the bottom. In this embodiment the sediment apparatus 700, the anchoring pile 705, and the support for the platform 701 can be preferably incorporated into a one central unit. The anchor point 705 is also the point of suction of sediment into vessel 702. This preferably makes this type of sediment harvesting pump (SHP) far simpler to install than the other SHP embodiments. In this embodiment, the sediment pump 704 can be preferably lowered into position from the top of the vessel 702 and as such it can be easily accessed for maintenance and whenever necessary. Pump 704 can be removable.

In one embodiment, pump 704 preferably can be lowered from top of vessel 702 from an access point on platform 701. Platform 701 can preferably include a crane or electric winch 925 that can be used to lift and lower pump 704. Pump 704 can preferably have a lift ring 726 that can be attached to a crane or electric winch 925. Pump 704 pulls sediment 712 from the lower end of vessel 702. In one embodiment, the lower the placement of pump 704 within vessel 702 results in more effective suction of sediment. For example, sediment pump 704 can preferably be about 20 feet or more below the top of the pipe or vessel 702.

In a preferred embodiment, pump 704 is a commercially available submersible sediment pump that may be driven by an electric or hydraulic motor. This type of pumps has agitators and impellers that are designed to slurry the sediment and pump it out through attached hose or piping.

In one embodiment, central vessel 702 and platform 701 can also manage controls and electricity for multiple sediment pumps 704.

The sediment harvesting platform 701 can be fabricated preferably of steel and can be preferably designed to be high enough above the river surface 710 to prevent flooding and to be hurricane proof.

Alternatively, the platform 701 can be made of reinforced concrete, plastic, or composite material.

Any embodiment of the present invention including parameters such as the dimensions and evacuation rates of the present invention are preferably scalable to needs of any project. The following ranges are provided as examples only.

The platform 701 is preferably mounted at a height of 5 to 50 feet high above the water level 710. More preferably, the platform 701 is mounted at a height of 10 to 30 feet high above the water level 710. Most preferably, the platform 701 is mounted at a height of 15 to 20 feet high above the water level 710. In various embodiments, the platform 701 is mounted at a height within a range between any two measurements within the above mentioned ranges.

The electrical power supply is preferably connected by an overhead wire 714 or by an underground cable. The platform 701 preferably includes a shelter 725, which preferably houses mechanical equipment, electrical equipment, electronic controls, etc. The shelter 725 also includes a water pump 780 and a directional flow control valve or manifold 720. The directional flow control valves 720 can preferably have remote control valves 726 used to direct water flow where needed. Water pump 780 is preferably used to supply clean (sediment free) water for multiple purposes.

Figure 16:
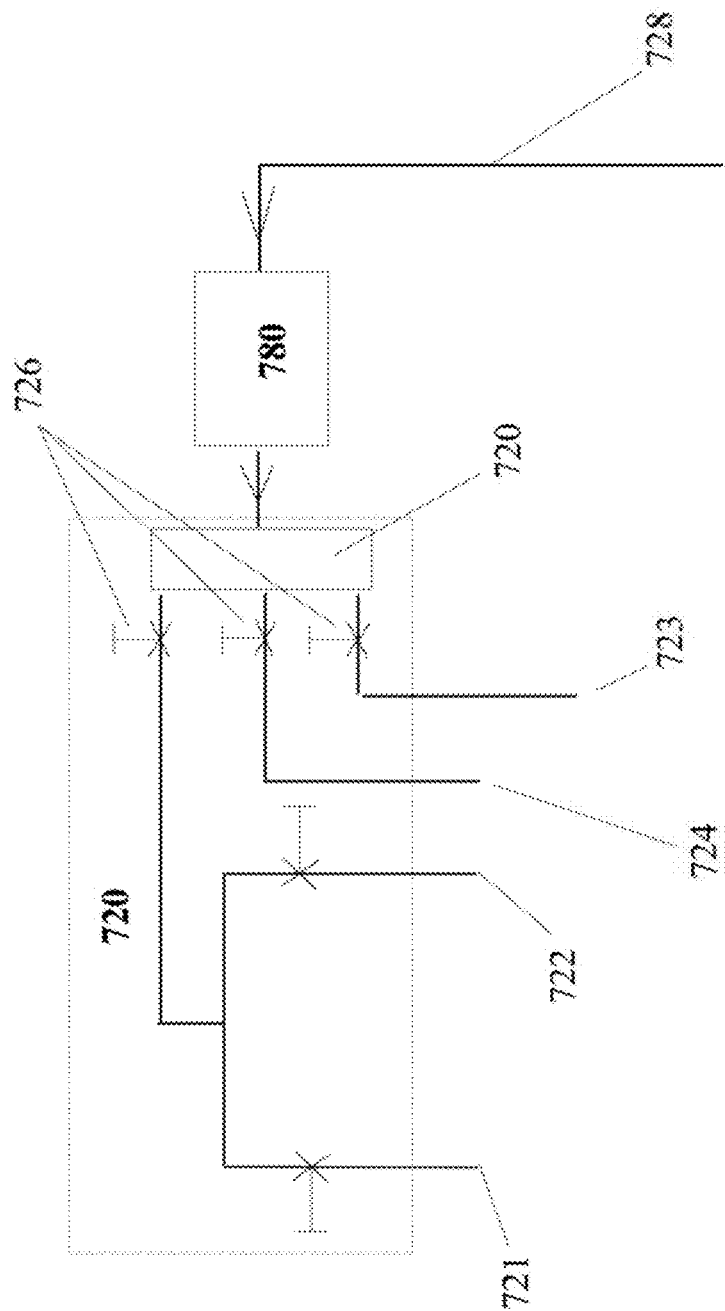
FIG. 16 is a partial view of a preferred embodiment of the apparatus of the present invention showing a close up of the manifold, directional flow control valve and pump system.

The directional flow control valve 720 is preferably used to direct clean water flow from clean water inlet 728 to where and when it is needed. In a preferred embodiment the clean water can be directed to 1) flush or backwash 721 the sediment outflow pipeline 716 from the platform 701; 2) to backflush 722 the sediment pump 704; 3) to supply water 723 to water jets 706 and/or; 4) to supply water 724 into the central vessel 702 thereby regulating the water-to-sediment ratio at the pump 704 (see FIG. 16).

The directional flow control valve 720 can also preferably be used to direct the shut down cycle, including backwash of pump 704 and backwash of sediment outflow pipeline 716.

Power supply can also be from alternative energy sources, including solar power, wind power, hydro-mechanical, and/or hydro-electric power generators. In one embodiment, the apparatus can comprise a solar power supply and an excavation rate device may be used to excavate 1-10 cubic yards per day.

The height of the shelter 725 is preferably 6 to 40 feet. More preferably, the height of the shelter 725 is 8 to 30 feet. Most preferably, the height of the shelter 725 is 10 to 20 feet. In various embodiments, the height of the shelter 725 is within a range between any two measurements within the above mentioned ranges.

The length of the shelter 725 is preferably 10 to 100 feet. More preferably, the length of the shelter 725 is 15 to 80 feet. Most preferably, the length of the shelter 725 is 20 to 30 feet. In various embodiments, the length of the shelter 725 is within a range between any two measurements within the above mentioned ranges.

The width of the shelter 725 is preferably 10 to 80 feet. More preferably, the width of the shelter 725 is 15 to 80 feet. Most preferably, the width of the shelter 725 is 20 to 30 feet. In various embodiments, the width of the shelter 725 is within a range between any two measurements within the above mentioned ranges.

Figure 34:
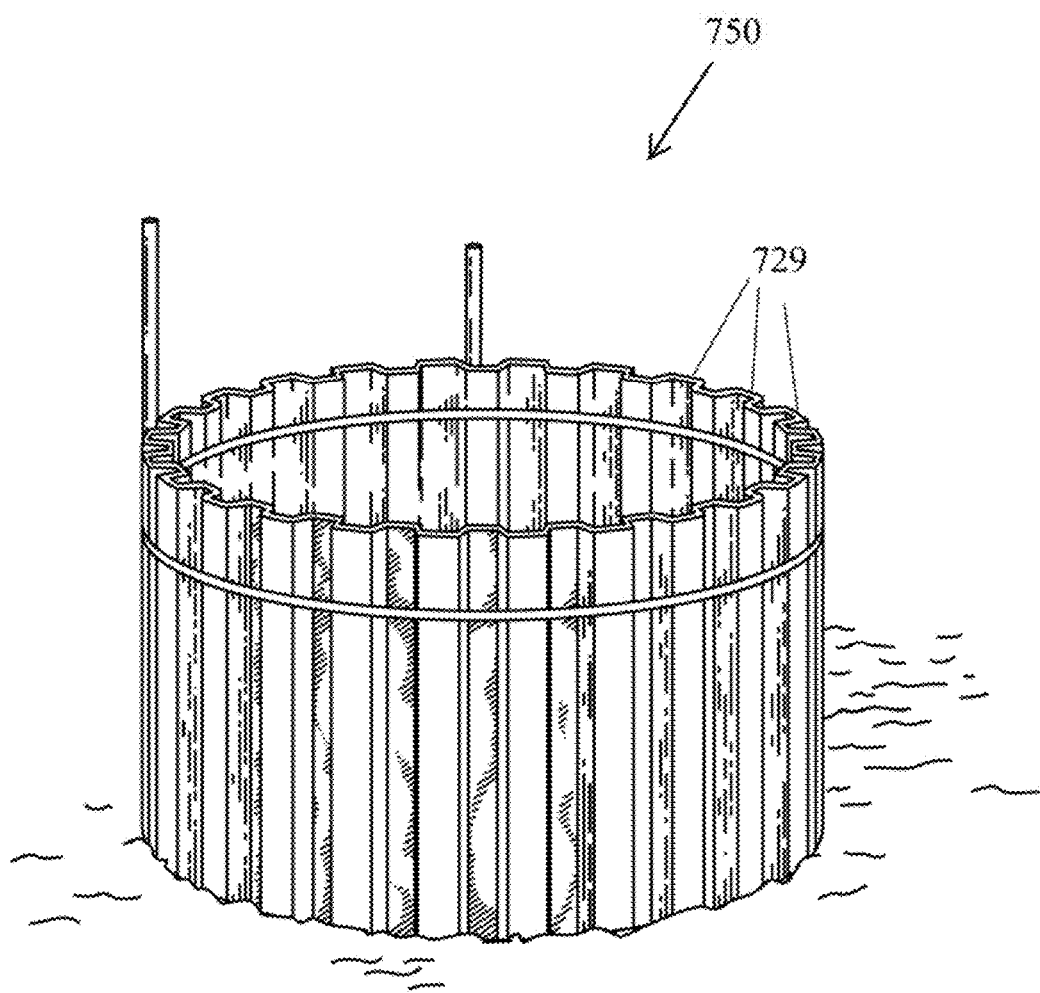
FIG. 34 is a perspective view of sheet pile casings and installation.
Figure 35:
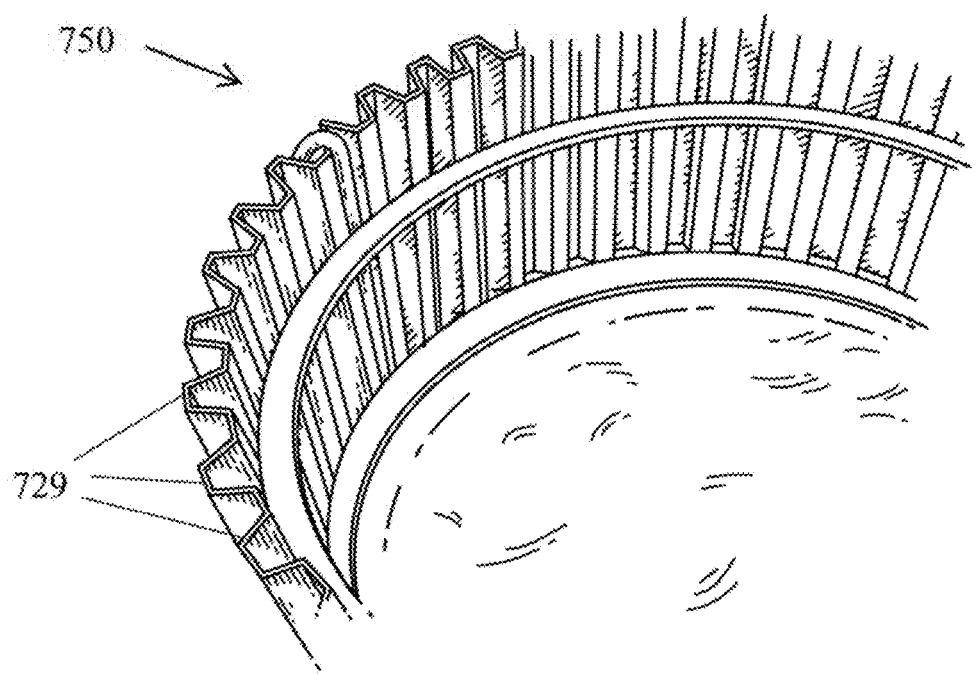
FIG. 35 is a partial perspective view showing sheet pile casings and installation.

The platform 701 is preferably mounted on a central vessel 702. In one embodiment, the central vessel 702 can be a large diameter steel pipe. In an alternative embodiment, the central vessel 702 may be made of interlocking steel panels such as steel sheet pilings 729 to create an enclosed casing 750 (see FIGS. 34, 35). Sheet pilings 729 can be preferably driven or sent down with a crane into a specified location requiring sediment harvesting. In another embodiment, vibration can preferably be used to place sheet pilings 729 into sediment. The sheet pilings 729 circle a specified area, and then the area is excavated. The area created by the enclosed sheet piling casing 750 can be a large area. Platform 701 can preferably be placed above the enclosed casing 750. The remaining components (such as vents 703, sediment pump 704, water jets 706, etc.) may be installed after the casing 750 is constructed in situ.

Alternatively, the central vessel 702 can be made of material such as but not limited to wood, plastic, or composite material. The central vessel 702 preferably includes pipes, wire, and control lines 709. The pipes, wires, and control lines 709 preferably connect the power supply and control platform 701 to a sediment pumping apparatus 704 below. The sediment conveyors 119 can be incorporated into any embodiment of the present invention.

Any embodiment of the present invention including parameters such as the dimensions and evacuation rates of the present invention are preferably scalable to needs of any project. The following ranges are provided as examples only.

The diameter of the central vessel 702 is preferably 2 to 10 feet. More preferably, the diameter of the central vessel 702 is 2.5 to 8 feet. Most preferably, the diameter of the central vessel 702 is 3 to 6 feet. In various embodiments, the diameter of the central vessel 702 is within a range between any two measurements within the above mentioned ranges.

The length of the central vessel 702 is preferably 40 to 200 feet. More preferably, the length of the central vessel 702 is 60 to 175 feet. Most preferably, the length of the central vessel 702 is 75 to 150 feet. In various embodiments, the length of the central vessel 702 is within a range between any two measurements within the above mentioned ranges.

The central vessel 702 preferably includes a means for filtering slurried or liquefied sediment such as a vent 703 (see FIGS. 11, 13, 15, 20). The vents 703 are preferably incorporated around the perimeter of the vessel 702 and allow sediment 712 to flow into the vessel 702. The vents 703 preferably include long slots 731 in the vessel casing 702 and preferably includes a grating 732, which is preferably sized to keep larger debris from getting into the vessel 702.

In one embodiment, a water or air pressurized pump can be used to blow out vents 703 to keep vents 703 clear.

The grating 732 preferably has a slot width of about ¼ to 3 inches. More preferably, the grating 732 has a slot width of about ½ to 2 inches. Most preferably, the grating 732 has a slot width of about is ¾ to 1½ inch. In various embodiments, the grating 732 has a slot width within a range between any two measurements within the above mentioned ranges.

The central vessel 702 preferably includes a means for removing slurried or liquefied sediment such as a sediment pump 704. The sediment pump 704 preferably removes slurried or liquefied sediment 712 from the sediment pit 715 and preferably pumps the sediment 712 through pipelines 716. The sediment pump 704 is preferably at a certain depth next to the vents 703 in the vessel 702. Sediment pit 715 has perimeter 719, which becomes larger as the sediment pump 704 removes slurried or liquefied sediment from the sediment pit 715 (see FIGS. 14, 33).

Figure 33:
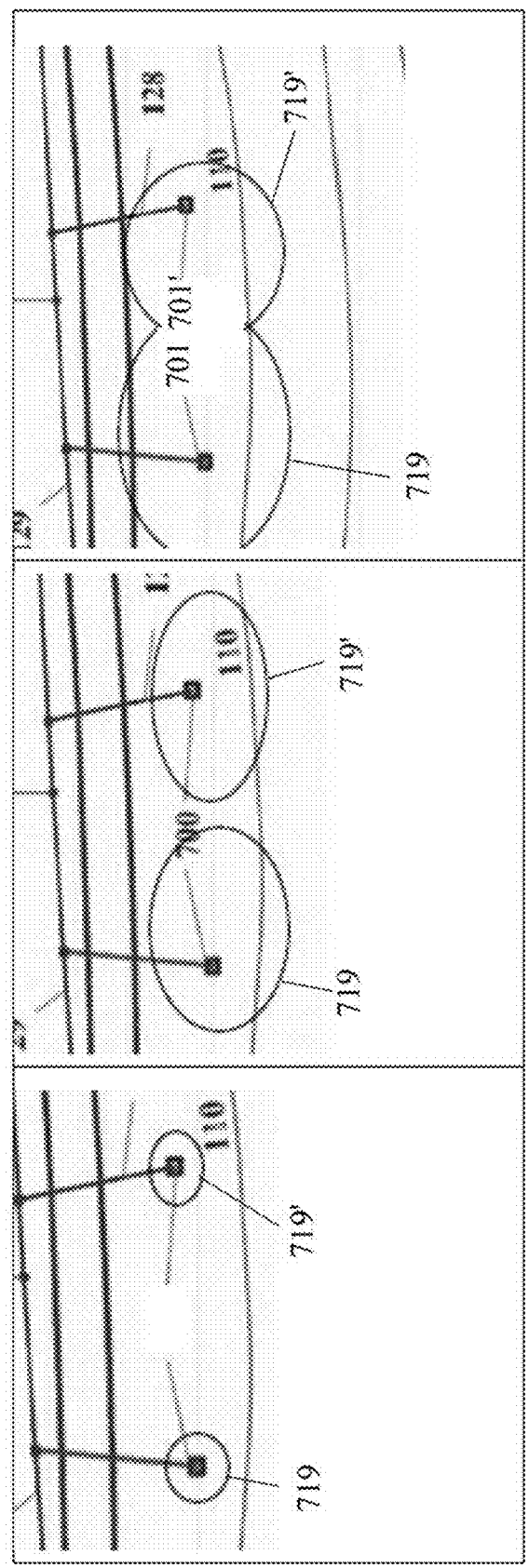
FIG. 33 shows top views of a sequence of a preferred embodiment of the method of the present invention showing a section of river with multiple sediment harvesting platforms and respective sediment pit perimeters.

FIG. 33 shows top views of a sequence of a preferred embodiment of the method of the present invention showing a section of river showing multiple spaced apart sediment harvesting platforms 701 and 701' and respective sediment pit perimeters 719 and 719' growing larger (from left schematic, to middle schematic, to right schematic) as the sediment pump 704 removes slurried or liquefied sediment from the sediment pit 715, ultimately connecting each pit perimeter 719 and 719' to each other, preferably forming a single, larger pit, for example.

The sediment pump 704 is preferably of a type of pump preferably providing sufficient torque for moving a combination of water and sediment to the pipeline/outflow pipe 716. In various embodiments, the pump 704 is a commercially available and serviceable. The sediment pump 704 can be, for example, a centrifugal pump or positive displacement pumps. In other embodiments, the pump 704 maybe electrically or hydraulically driven.

The sediment pump 704 preferably has a flow rate of 50 to 5000 gpm. More preferably, the sediment pump 704 has a flow rate of 175 to 3500 gpm. Most preferably, the sediment pump 704 has flow rate of 350 to 2500 gpm. In various embodiments, the sediment pump 704 has a flow rate within a range between any two measurements within the above mentioned ranges.

The sediment pump 704 preferably has an excavation rate of 3 to 300 cubic yards per hour. More preferably, the sediment pump 704 has an excavation rate of 10 to 200 cubic yards per hour. Most preferably, the sediment pump 704 has an excavation rate of 20 to 150 cubic yards per hour. In various embodiments, the sediment pump 704 has an excavation rate within a range between any two measurements within the above mentioned ranges.

The ratio of sediment to water pumped with the sediment pump 704 preferably ranges from $1/20$ to $1/2$. More preferably, the ratio of sediment to water pumped with the sediment pump 704 ranges from $1/10$ to $2/5$. Most preferably, the ratio of sediment to water pumped with the sediment pump 704 ranges from $1/6$ to $1/3$. In one embodiment, the ratio of sediment to water pumped with the sediment pump 704 ranges 10/90 to 30/70. In various embodiments, the ratio of sediment to water pumped with the sediment pump 704 is within a range between any two measurements within the above mentioned ranges.

In one embodiment, the apparatus 700 uses a two stage pumping process to preferably create more pressure to move the slurried or liquefied sediment longer distances in the outflow pipeline 716. In this embodiment, the sediment pump 704 feeds into a secondary booster pump mounted on the platform 701. In this embodiment, both pumps supply the outflow pipeline 716.

Any embodiment of the present invention including parameters such as the dimensions and evacuation rates of the present invention are preferably scalable to needs of any project. The following ranges are provided as examples only.

The secondary booster pump preferably has a flow rate of 50 to 5000 gpm. More preferably, the secondary booster pump has a flow rate of 175 to 3500 gpm. Most preferably, the secondary booster pump has flow rate of 350 to 2500 gpm. In various embodiments, the secondary booster pump has a flow rate within a range between any two measurements within the above mentioned ranges.

The secondary booster pump preferably has an output pressure of 10 to 200 psi. More preferably, the secondary booster pump has an output pressure of 20 to 160 psi. Most preferably, the secondary booster pump has an output pressure of 40 to 120 psi. In various embodiments, the secondary booster pump has an output pressure within a range between any two measurements within the above mentioned ranges.

Any pump used in an apparatus of any embodiment may be a reversible pump.

The apparatus 700 preferably includes a means for positioning and stabilizing the apparatus on a water bottom 711 such as a steel piling 705. The steel piling 705 is preferably mounted below the vessel 702 and preferably anchors apparatus 700 deep in the waterway bottom 711. Alternatively, the piling 705 can be made of material such as but not limited to wood, plastic, or composite material.

The diameter of the piling 705 is preferably 12 to 100 inches. More preferably, the diameter of the piling 705 is 18 to 80 inches. Most preferably, the diameter of the piling 705 is 24 to 60 inches. In various embodiments, the diameter of the piling 705 is within a range between any two measurements within the above mentioned ranges.

The length of the piling 705 is preferably 30 to 200 feet. More preferably, the length of the piling 705 is 40 to 150 feet. Most preferably, the length of the piling 705 is 50 to 100 feet. In various embodiments, the length of the piling 705 is within a range between any two measurements within the above mentioned ranges.

Figure 14:
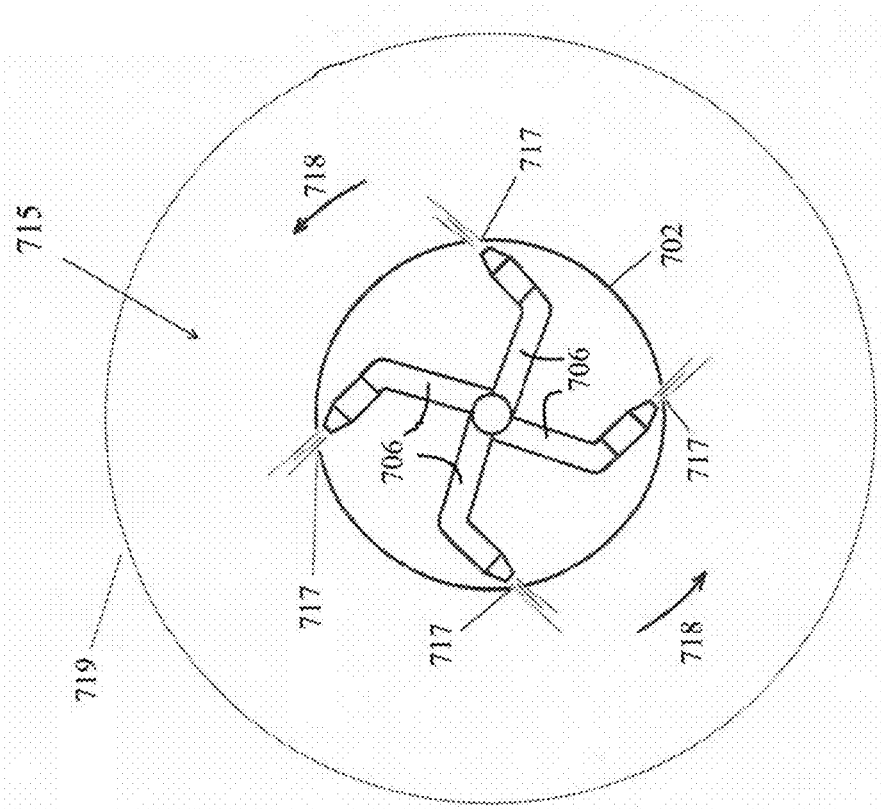
FIG. 14 is a top view of a preferred embodiment of the apparatus of the present invention showing jets, flow rotation and sediment pit perimeter.
Figure 13:
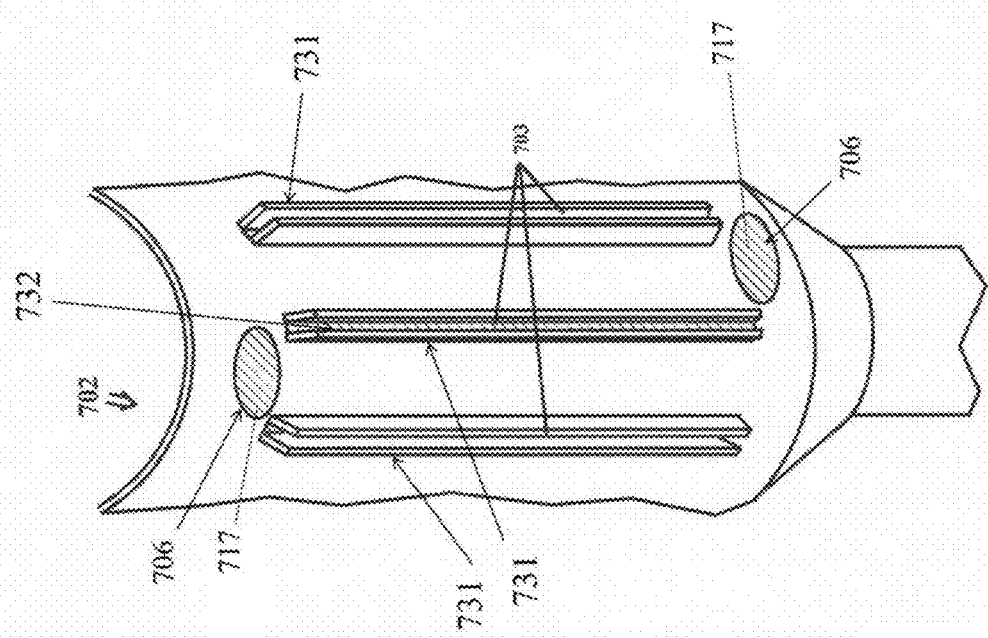
FIG. 13 is a partial perspective view of a preferred embodiment of the apparatus of the present invention showing the jet openings and vents.

The central vessel 702 preferably includes a means for slurrying or liquefying sediment such as a water jet 706 or a plurality of jets. The water jets 706 are preferably mounted at the upper and lower ends of the vents 703, as seen in FIG. 13, and preferably agitate and slurry or liquefy sediment. The jets 706 are preferably mounted around the periphery inside the central vessel 702 and preferably aiming out through the vents 703 so as preferably prevent blockage of the jets by, for example, sand and sediments when water is not flowing. Jets 706 can be preferably configured as seen in FIG. 14, and create a flow rotation as indicated by arrows 718. Jets 706 can preferably have jet openings 717 (see FIGS. 13, 14). Jet openings 717 can line up with vent slots 731.

In a preferred embodiment, the jets 706 may be preferably located on an interior surface of the central vessel 702 and water may come through slots in a clean chamber. In some embodiments, the jets 706 may be angled and moved up and down relative to an axis of the central vessel 702. Preferably, the jets 706 may be removable for cleaning and service. In one embodiment, jets 706 align with vent slots 731 and can be guided within vessel 702. Jets 706 can be preferably removable by a crane or electric winch 925 from vessel 702 interior for servicing or replacement.

In one embodiment, the sediment 712 can be pumped out with a commercially available interchangeable sediment pump 704 that can be lowered into central vessel 702. Jets 706 can supply water at the lower extremity of vessel 702 and the sediment slurry flows into the central vessel 702 through vents 703 to pump 704 that continues evacuating water and sediment inside of the central vessel 702.

Figure 15:
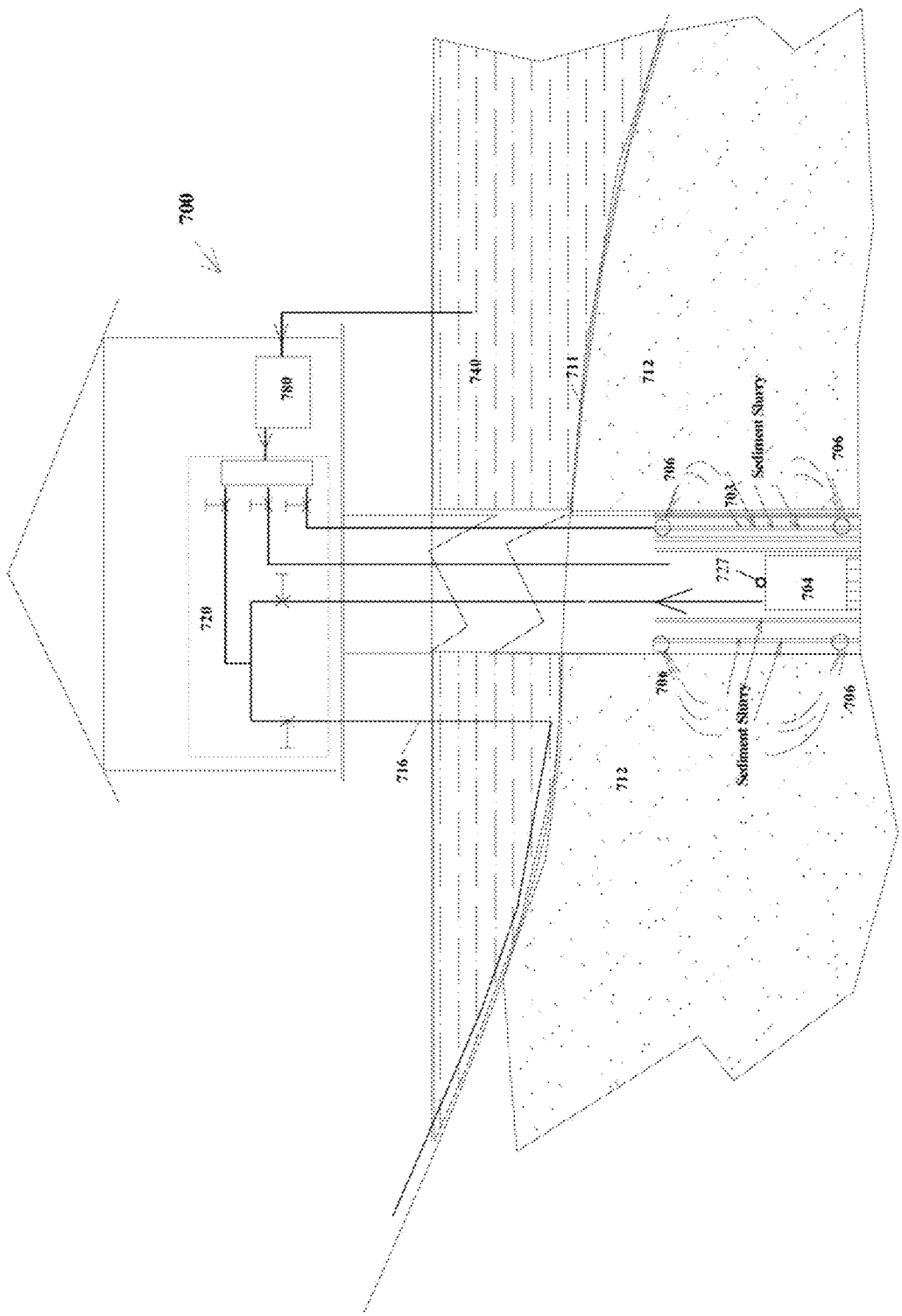
FIG. 15 is a side view of a preferred embodiment of the apparatus of the present invention of a sediment harvesting sink with a platform installed in a layer of sediment in a cross-section of a river, wherein the sink is in the form of a cylindrical tube.

In one embodiment, jets 706 create a tornado effect, such as a counterclockwise rotation, at the bottom of the vessel 702 in sediment pit 715, facilitating the movement of sediment 712 into vents 703 and into the vessel 702 interior for evacuation (see for example FIGS. 14, 15).

Exemplary commercially available sediment pumps include the Flygt 5100/5150 Submersible Slurry Pumps and Dragflow Electric Pump EL 12.5S. Other similar pumps can also be used.

The water jets 706 preferably have an output pressure of 30 to 500 psi. More preferably, the water jets 706 have an output pressure of 50 to 300 psi. Most preferably, water jets 706 have an output pressure of 60 to 250 psi. In various embodiments, the water jets 706 have an output pressure within a range between any two measurements within the above mentioned ranges.

In one embodiment, the water jets 706 emits water at a pressure similar to a pressure used in water injection dredging processes such that the sediment is suspended in water.

In one embodiment, the water jets 706 emits water at a pressure similar to a pressure used in agitation dredging.

The apparatus 700 preferably includes a plurality of water jets 706. More preferably, the apparatus includes an array of water jets 706 (see FIGS. 14, 20). In one example, the apparatus has 16 jets. The water jets 706 are preferably spaced on the outer surface of an annular tube/pipe 730 having a bore. The annular tube/pipe 730 is preferably placed within the central vessel 702 and adjacent to the vents 703. In one embodiment, the annular tube/pipe 730 is placed around the central vessel 702. More preferably, the annular tube/pipe 730 is positioned within central vessel 702 with the water jets 706 being aligned with the vents 703 such that water stream expelled from the water jets 706 exits out of the central vessel 702 through the vents 703 (see FIG. 27-32).

In various embodiments, the annular tube/pipe 730 may be positioned at any point along the length of the vents 703. For example, the annular tube/pipe 730 may be positioned at the top, middle, or bottom of the vents 703 as shown in FIGS. 7 and 13. In one embodiment, the apparatus 700 includes a plurality of spaced annular tubes/pipes 730 with water jets 706. In one embodiment, the annular tube/pipe 730 and water jets 706 are vertically movable and attached to a power device such as a motor that the position of the annular tube water jets 706 relative to the vents 703 can be changed. The vertical movement preferably allows for reciprocal motion of the annular tube/pipe 730 and water jets 706.

In one embodiment, the tube/pipe 730 is sized and shaped for the water jets 706 to function optimally.

The annular tube/pipe 730 is preferably connected to the directional flow control valve 720 in the shelter, wherein water from the water pump 780 can be directed to the annular tube/pipe 730 and the water jets 706.

As shown in FIG. 7, the apparatus 700 includes a water pump 780 preferably located in the shelter 725 and sediment pump 704 located within the central vessel 702 at a position adjacent to the vents 703. The directional flow control valve 720 preferably located in the shelter 725 preferably and operatively connects to the water pump 780, sediment pump 704, pipes 709, and outflow pipeline 716 in a manner to allow for control of various water flows.

A preferred embodiment includes a method of using apparatus 700 to remove sediment 712 from a sediment pit 715. In the method, the water pump 780 is preferably engaged to use water from a water source 728 to prime/backwash 724 the central vessel 702 as well as clean 722 the sediment pump 704. Once primed and/or backwashed, the flow of the water is preferably shifted 723 to the water jets 706 and the sediment pump 704 is engaged. The water from the water jets 706 preferably suspends the sediment 712 for pumping through the sediment pump 704 and into the outflow pipeline 716.

The water pump 780 is preferably of a type of pump preferably providing sufficient torque for moving clean water from a water source and through the central vessel 702. The water pump 780 can be, for example, a centrifugal pump or positive displacement pumps.

The water pump 780 preferably has a flow rate of 200 to 10,000 gallon per minute (gpm). More preferably, the water pump 780 has a flow rate of 500 to 7500 gpm. Most preferably, the water pump 780 has flow rate of 1000 to 6000 gpm. In various embodiments, the water pump 780 preferably has a flow rate within a range between any two measurements within the above mentioned ranges.

The apparatus 700 may further include sensors preferably mounted within the apparatus 700 to preferably monitor important parameters in real time and send the measurements into a programmable logic controller (PLC) that will preferably control the operation of the apparatus 700. Sensors may include, but are not limited to: water flow sensor, sediment flow sensor, depth of sediment, depth of water, liquid pressure, liquid pressure within pipeline, water supply pressure, pump revolutions per minute (rpm), hydraulic system pressures, and water to sediment ratios. The microprocessor control will preferably activate sediment harvesting automatically when sediment is available; otherwise it can preferably remain passively inactive. The PLC can preferably vary the extent of the operation of the apparatus 10 relative to the monitoring parameters.

FIG. 38 is a side view of optical sensors of a preferred embodiment of the apparatus of the present invention. Optical beam sensor/transmitter 915 is preferably connected by a glass plate 916 to sediment line 917. Optical sensor 918 can be preferably connected by a glass plate 916 to sediment line 917. Optical sensor 918 preferably measures transmissivity. Optical sensor 918 preferably converts to electrical signal which is converted to a percentage of sediment to water in the sediment flow 920.

The optical sensor 918 depicted in FIG. 38 is one type of commercially available mass flow meters 919.

In one embodiment, optical beam sensor/transmitter 915 is preferably connected by wires 914 to a programmable logic controller (PLC), which PLC preferably monitors important parameters in real time and send the measurements into the computer that will preferably control the operation of optical beam sensor/transmitter 915.

In one embodiment, optical sensor 918 is preferably connected by wires 914 to a programmable logic controller (PLC), which PLC preferably monitors important parameters in real time and send the measurements into the computer that will preferably control the operation of optical sensor 918.

In one embodiment, the apparatus 700 may also include sediment conveyors 119, where the sediment conveyors 119 are connected to a directional flow control valve 720 of apparatus 700 and the directional flow control valve 720 regulates water flow to the sediment conveyors 119.

The apparatus 700 may also include a means for cleaning debris surrounding the central vessel. In one embodiment as shown in FIG. 8, the cleaning apparatus 802 comprising blades 805 that travel by mechanism through the length of the slot vents 703. In a preferred embodiment, the mechanism preferably moves multiple blades 805 that are attached to each other like a comb 802. In one embodiment, the mechanism is powered by air or hydraulic cylinders 806 that are attached to the comb 802 at attachment point 804. In one embodiment, the mechanism can preferably be powered by a power source including but not limited to electric solenoid or electro-mechanical components.

In one embodiment, cleaning apparatus or comb 802 is a mechanical component of the present invention that is preferably used to clear debris within the sediment layer 712. Comb 802 is preferably a cutting and smashing component of the apparatus 700. Blades 805 preferably extend out from within vessel 702 into vent slots 717, and preferably further than slots 717.

In a preferred embodiment, vent comb 802 may be slidably attached to an interior of vessel 702 and can preferably be moved within interior of vessel 702.

In one embodiment, the apparatus 700 further includes a cleaning assembly having cleaning elements such scrapers or blades 805 and a powering device for moving the cleaning elements such as an actuator 806 preferably in a reciprocal manner to remove debris from clogging the vents 703 and/or sediment pump 704, as shown in FIGS. 8, 9, 11, 12, 17-19 and 25-26.

The cleaning elements may extend through the slots of the vents 703 inwardly or vice-versa (outwardly) and are slidable along the length of the vent 703. For example, FIG. 8 shows blades 805 extending through the slots of the vents 703. The cleaning elements 805 are preferably sized and shaped to slidably fit within the slots of the vents 703. The cleaning elements 805 are preferably composed of hardened materials including, for example, steel or diamond.

Figure 9:
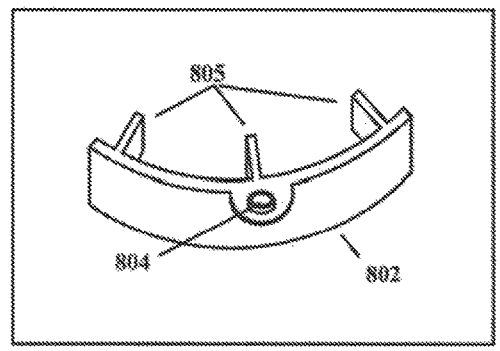
FIG. 9 is a partial perspective view of a vent comb with blades and an actuator attachment point.

FIGS. 8 and 9 also show the blades 805 attached to a vent comb 802. The vent comb 802 preferably has an arcuate shape that general conforms with the curvature of the vessel wall 801. In one embodiment, the vent comb 802 is annular and surrounds the vessel wall 801. The vent comb 802 is preferably composed of materials including, for example, steel, fiberglass, or composites. In another embodiment, the cleaning assembly includes a plurality of actuators 806 and blades 805 where each blade 805 is movably attached to a separate actuator 806.

FIGS. 8 and 9 also show the vent comb 802 having an actuator attachment point 804. The actuator attachment point 804 is preferably the point at which the actuator 806 can be preferably attached to the vent comb 802 that preferably allows for the actuator 806 to move the vent comb 802 in a reciprocal manner. In one embodiment, the mechanism is powered by air or hydraulic cylinders that are attached to the comb 802 at attachment point 804. In one embodiment, the power device is preferably powered by a power source including but not limited to electric solenoid or electro-mechanical components.

FIGS. 11 and 12 show the blades 805 attached to a vent comb 802, wherein the vent comb 802 preferably has an arcuate shape that general conforms with the curvature of the interior of the vessel wall 801. In one embodiment, the vent comb 802 is annular and fits on the interior of the vessel wall 801 (see FIGS. 25, 26).

Alternatively, the cleaning elements may extend through the slots of the vents 703 into the sediment pit 715 and may also be retractable. For example, the cleaning assembly may further include a mechanism for retracting the cleaning elements when not in use. The powering device when engaged preferably moves the cleaning elements reciprocally and with sufficient force to pulverize and/or slicing debris.

Figure 17:
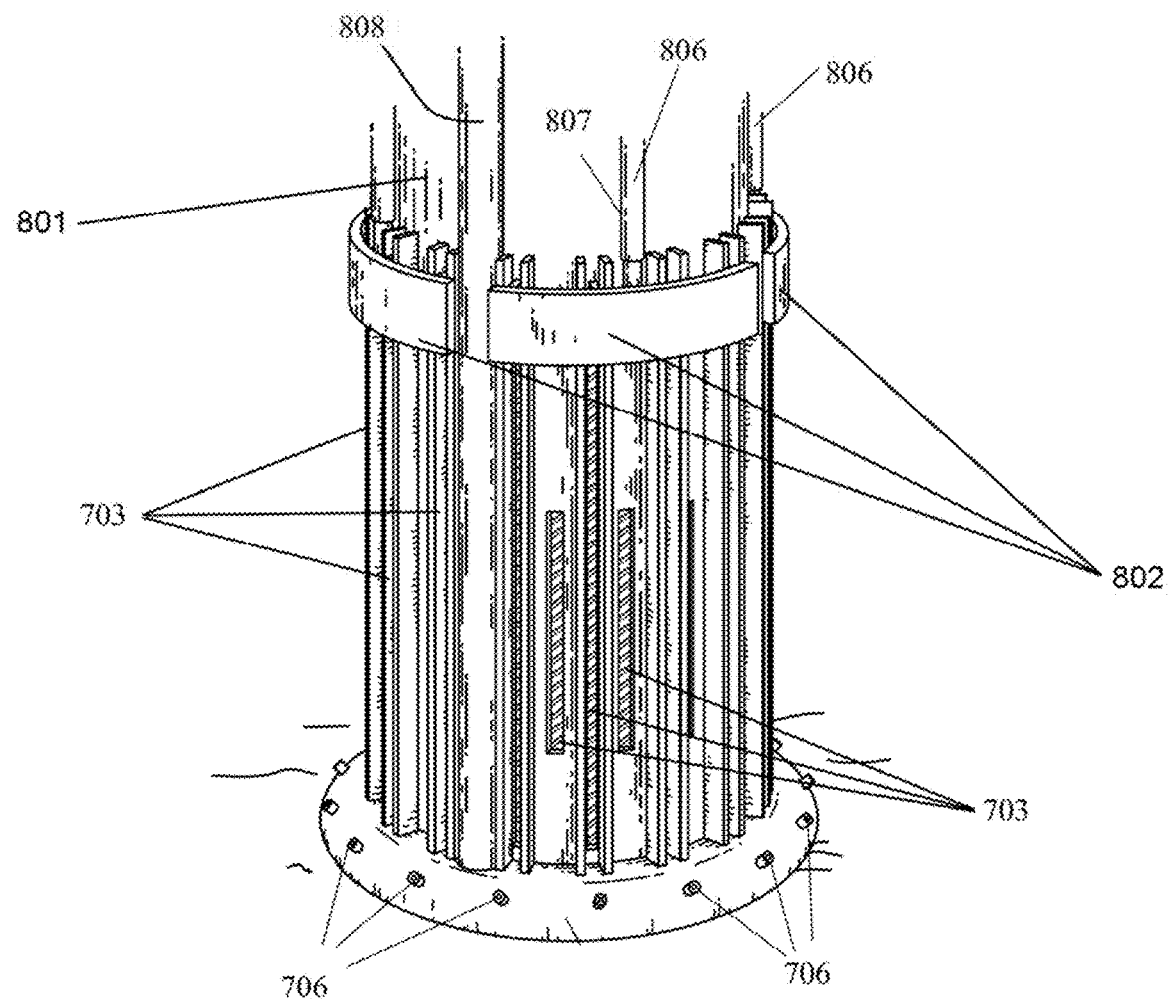
FIGS. 17-19 are partial perspective views showing a sequence of the combs in use, showing the combs and jets on the outside of vessel.
Figure 18:
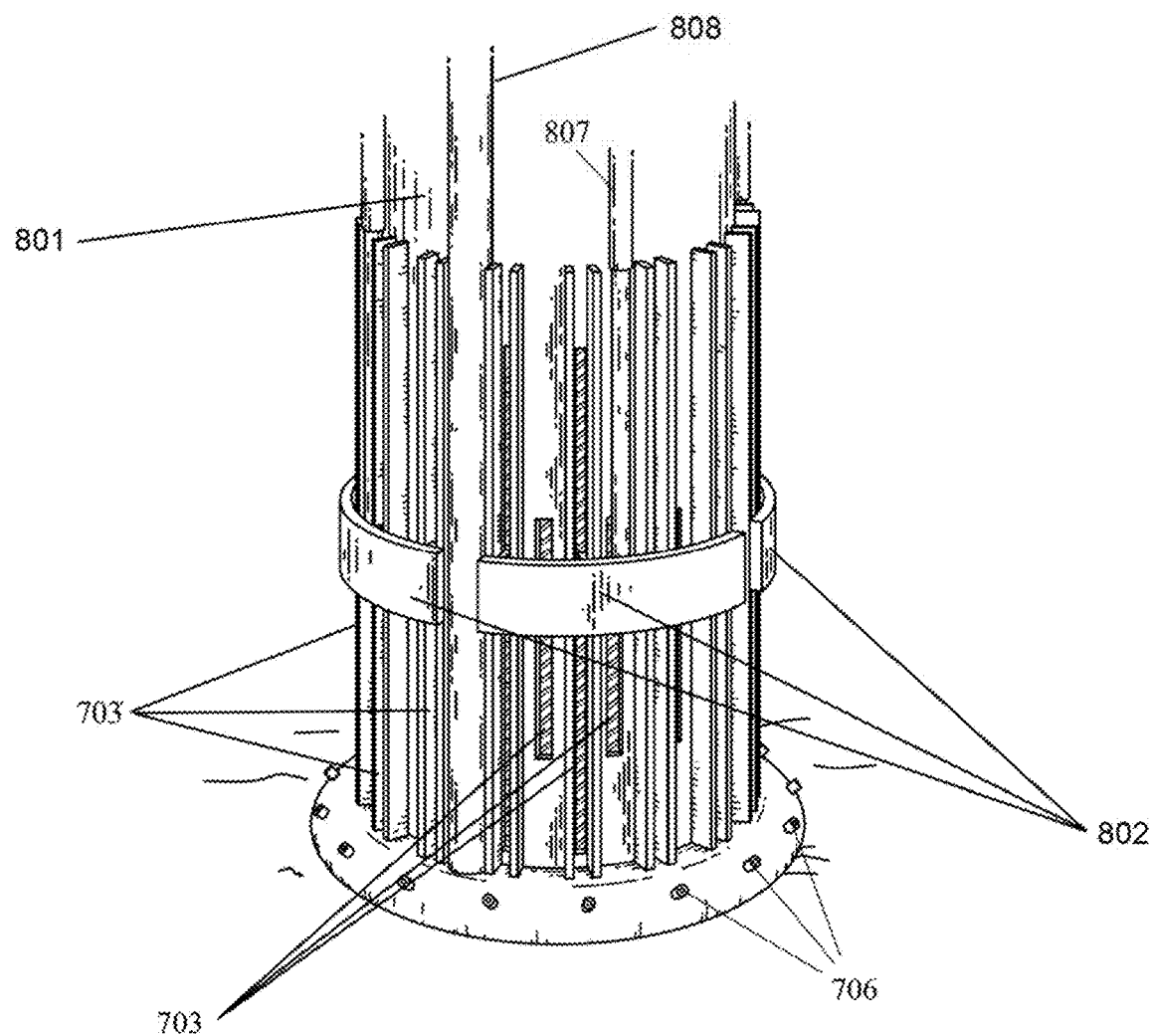
Figure 19:
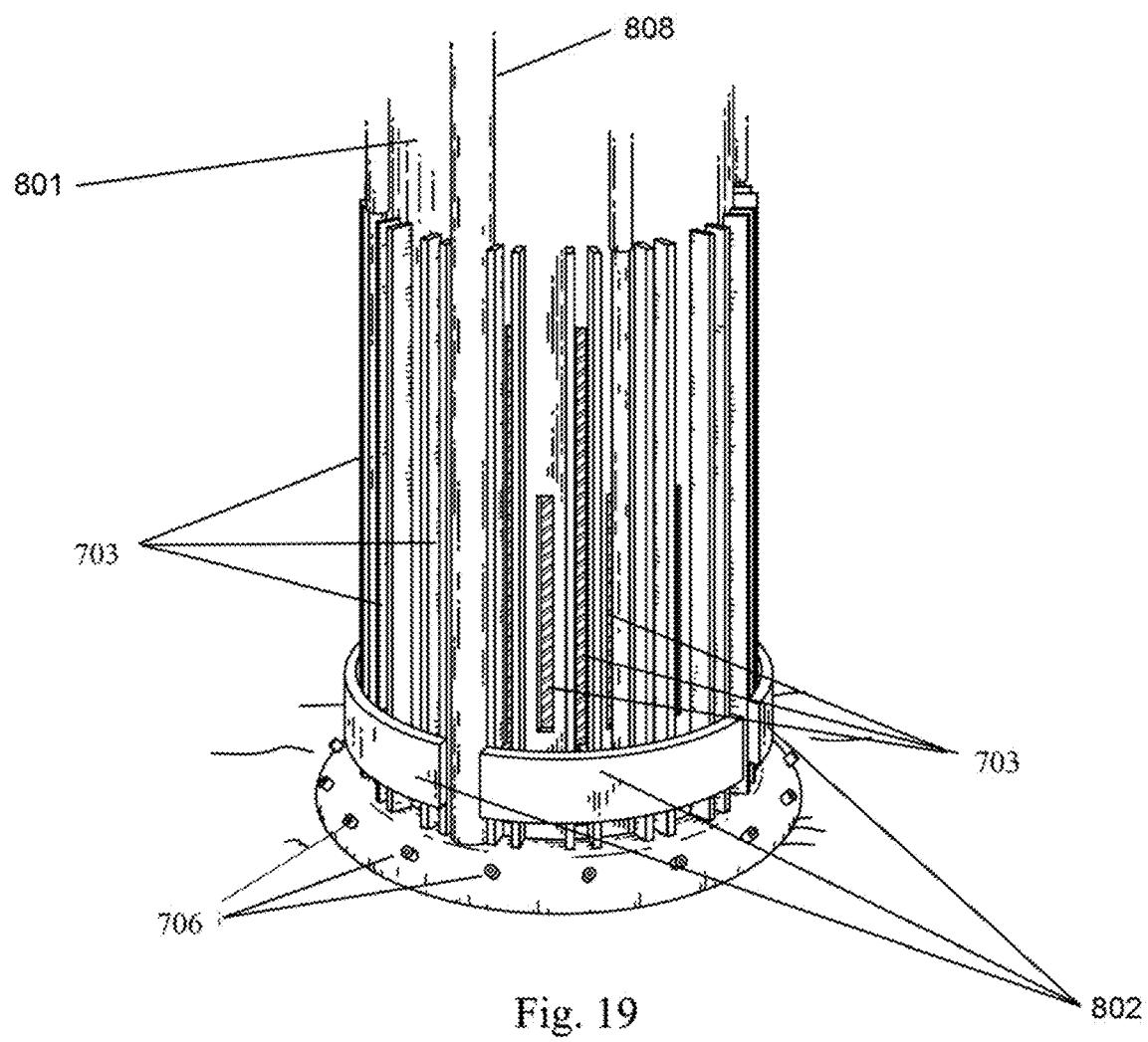

FIGS. 17-19 also show an embodiment where the cleaning assembly further includes a guide 807 such as tube extending along a length of the central vessel 702 before the slots of the vents 703 that preferably protects the actuator 806. FIG. 17-19 show the vent comb 802 located on the exterior of vessel 702, with blades 805 through vent slots 703. The progression of FIGS. 17-19 shows a sequence of how actuators move the cleaning assembly 802 along vent slots 703.

Figure 25:
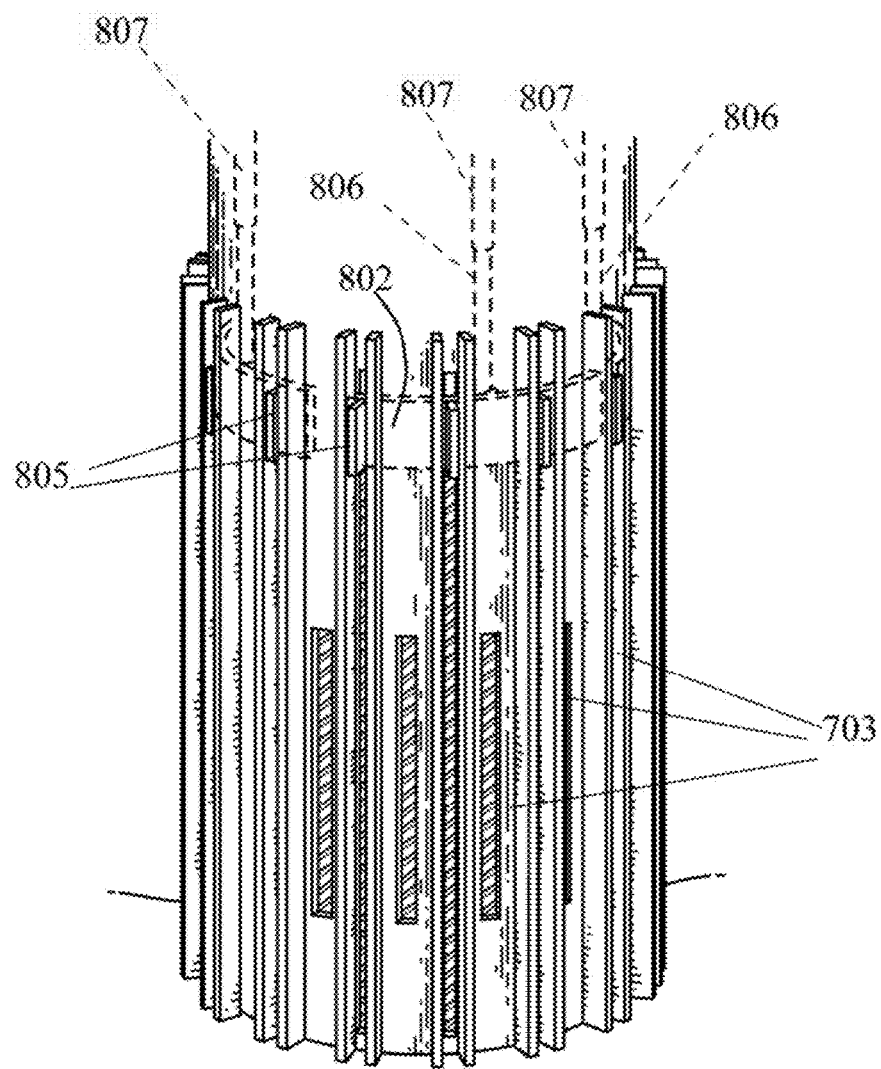
FIG. 25 is a partial perspective view of a preferred embodiment of the apparatus of the present invention showing the combs on the inside of the central vessel.
Figure 26:
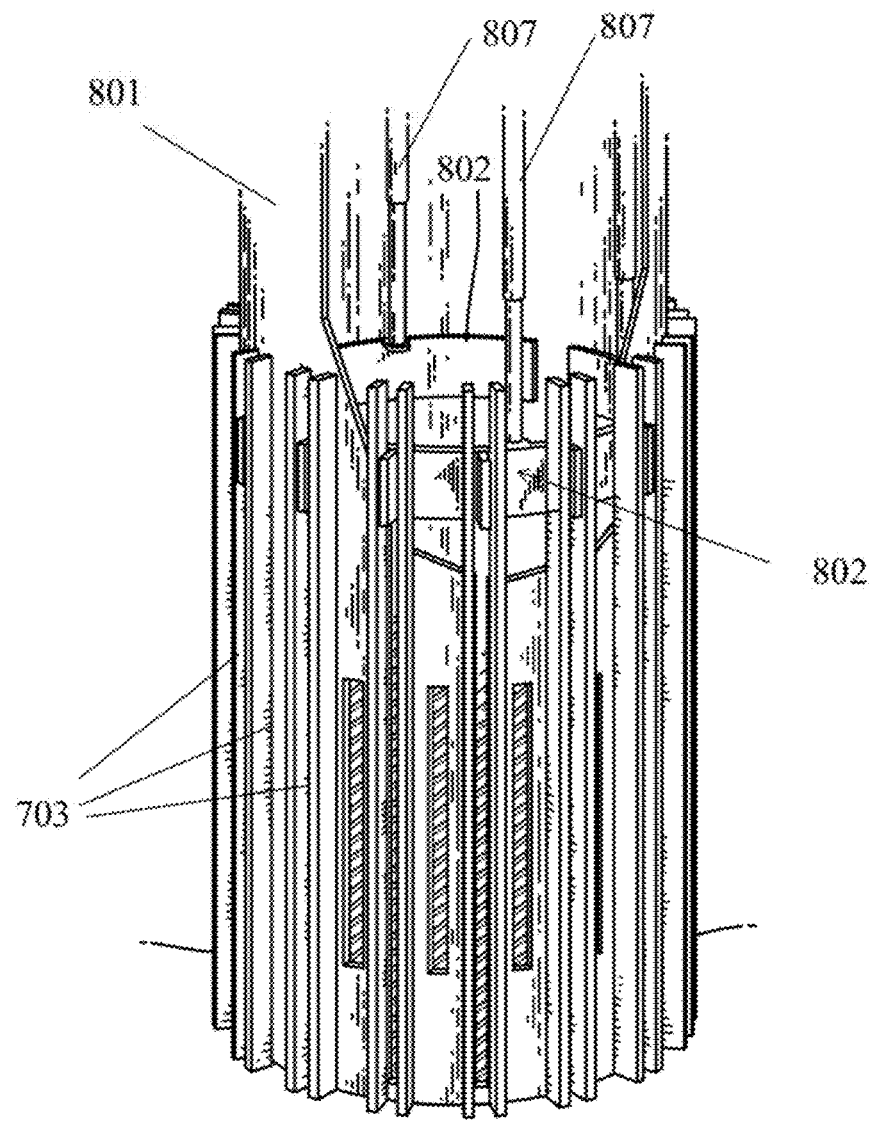
FIG. 26 is a cut away view of a partial perspective view of a preferred embodiment of the apparatus of the present invention showing the combs on the inside of the central vessel.

FIGS. 25 and 26 show the vent comb 802 located in the interior of vessel 702, with blades 805 through vent slots 703. A similar progression as seen in FIGS. 17-19 occurs in this embodiment, wherein actuators move the cleaning assembly 802 along vent slots 703.

In one embodiment, the cleaning assembly is continuously and simultaneously engaged with the sediment pump 704 and water jets 706 such that sediment 712 is being pulverized, slurried or liquefied, and removed from the sediment pit 715.

The apparatus 700 is preferably placed into the sediment layer 712 below the bottom surface 711. As sediment 712 is evacuated, a sediment pit 715 forms having an effective depth 707 and width 708. The following dimensions are presented as examples only where the depth 707 of the sediment pit 715 is preferably controlled by the design depth. A person of ordinary skill in the art would likely understand that the width 708 of the pit 715 depends on the environmental conditions such as but not limited to sediment consistency, water currents, etc.

The effective depth 707 is preferably 10 to 300 feet from the normal water bottom surface 711. More preferably, the effective depth 707 is 20 to 200 feet from the normal water bottom surface 711. Most preferably, the effective depth 707 is 40 to 60 feet from the normal water bottom surface 711. In various embodiments, the effective depth 707 from the normal water bottom surface 711 is within a range between any two measurements within the above mentioned ranges.

The effective width 708 is preferably 20 to 600 feet across the normal water bottom surface 711. More preferably, the effective width 708 is 40 to 400 feet across the normal water bottom surface 711. Most preferably, the effective width 708 is 80 to 300 feet across the normal water bottom surface 711. In various embodiments, the effective width 708 across the normal water bottom surface 711 is within a range between any two measurements within the above mentioned ranges. In one embodiment, the sediment harvesting apparatus having sediment conveyors preferably expand the area of influence from which sediment will be gathered and harvested.

In one embodiment of the present invention, the sediment harvesting apparatus can excavate and pump 1-10 cubic yards per day. In one embodiment, the sediment harvesting apparatus preferably has a large multiple pump platform that excavate and pump 1000s of cubic yards a day.

As a prophetic example, it is possible for blockage of the pipes and pipelines to occur when the sediment harvesting apparatus is not in use. To this extent, the apparatus of any embodiment of the present invention is preferably designed to prevent water flow blockage resulting from, for example, underground sand. The design preferably prevents water flow blockage when water is not flowing through the pipes and pipelines.

In one embodiment, check-valve(s) preferably block sediment from entering the piping system when water is not flowing.

In one embodiment, an apparatus of the present invention preferably comprises means for removing water flow blockages resulting from, for example, underground sand entering water flow in the pipes and pipelines when water is not flowing.

In one embodiment, vibrating mechanism(s) preferably remove blockages in pipes by sand or sediment. In one embodiment pressurized air is used to remove blockages in pipes by sand or sediment.

In one embodiment, the jets of any embodiment is preferably designed to prevent water flow blockage of the pipes and pipelines.

Figure 10:
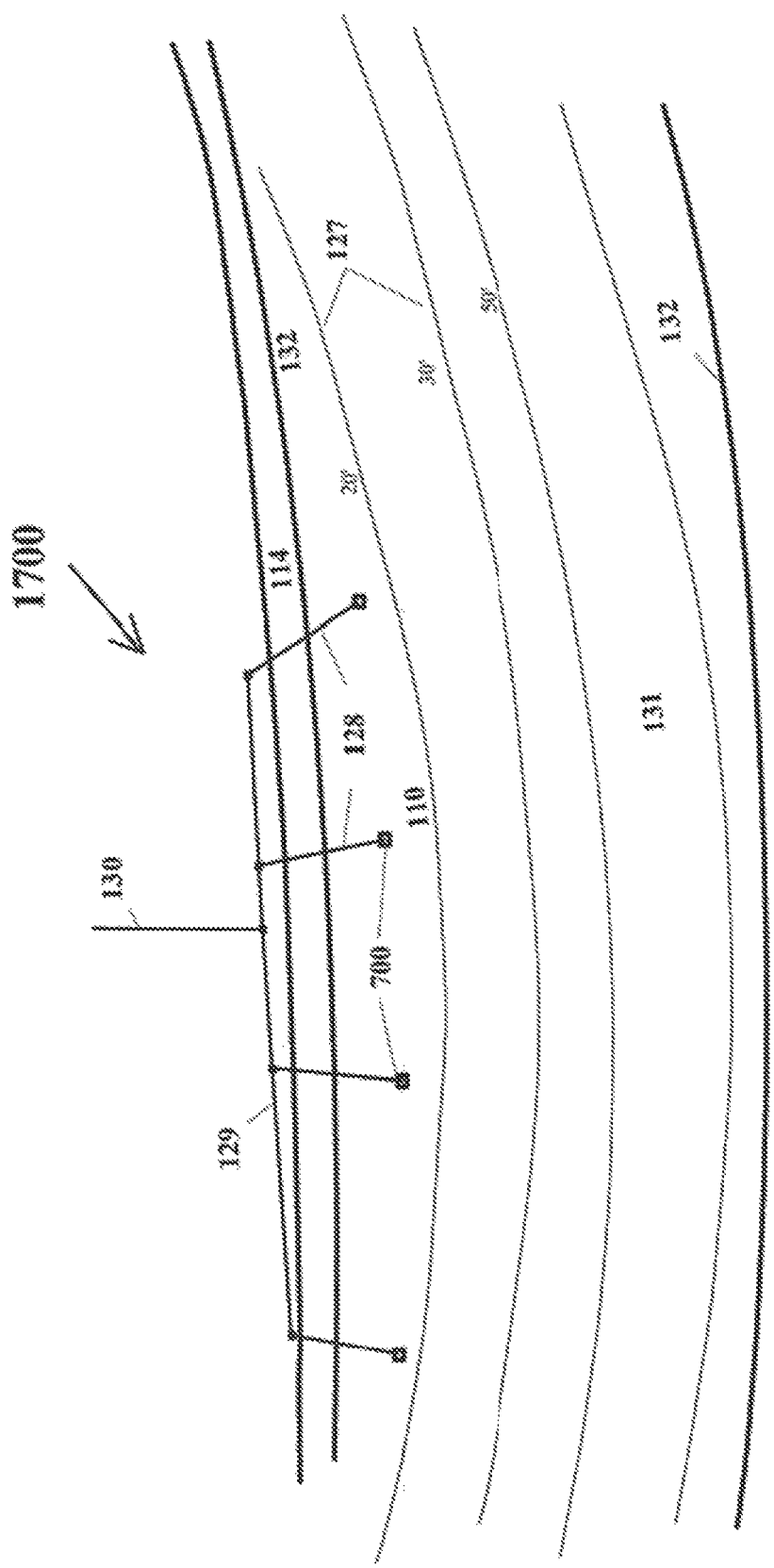
FIG. 10 is a top view of a preferred embodiment of the system of the present invention showing a section of river with an array of four sediment harvesting platforms connected in parallel to a sediment delivery pipeline.

One embodiment of the invention includes a system 1700 and method for the deploying the apparatuses 700 in series, wherein the sediment pits 715 are strategically placed in a river bed within the natural sand bars, outside of the traditional river navigational channel as shown in FIG. 10. In areas where the sand bars are close to the existing river levee electrical power can be easily supplied to the sediment sink(s) to run the hydraulic system, controls and pumps. Having three or four sediments sinks configured in parallel will provide more material over a larger time span to the sediment delivery pipeline. This will increase economic efficiency of the sediment delivery project.

Figure 20:
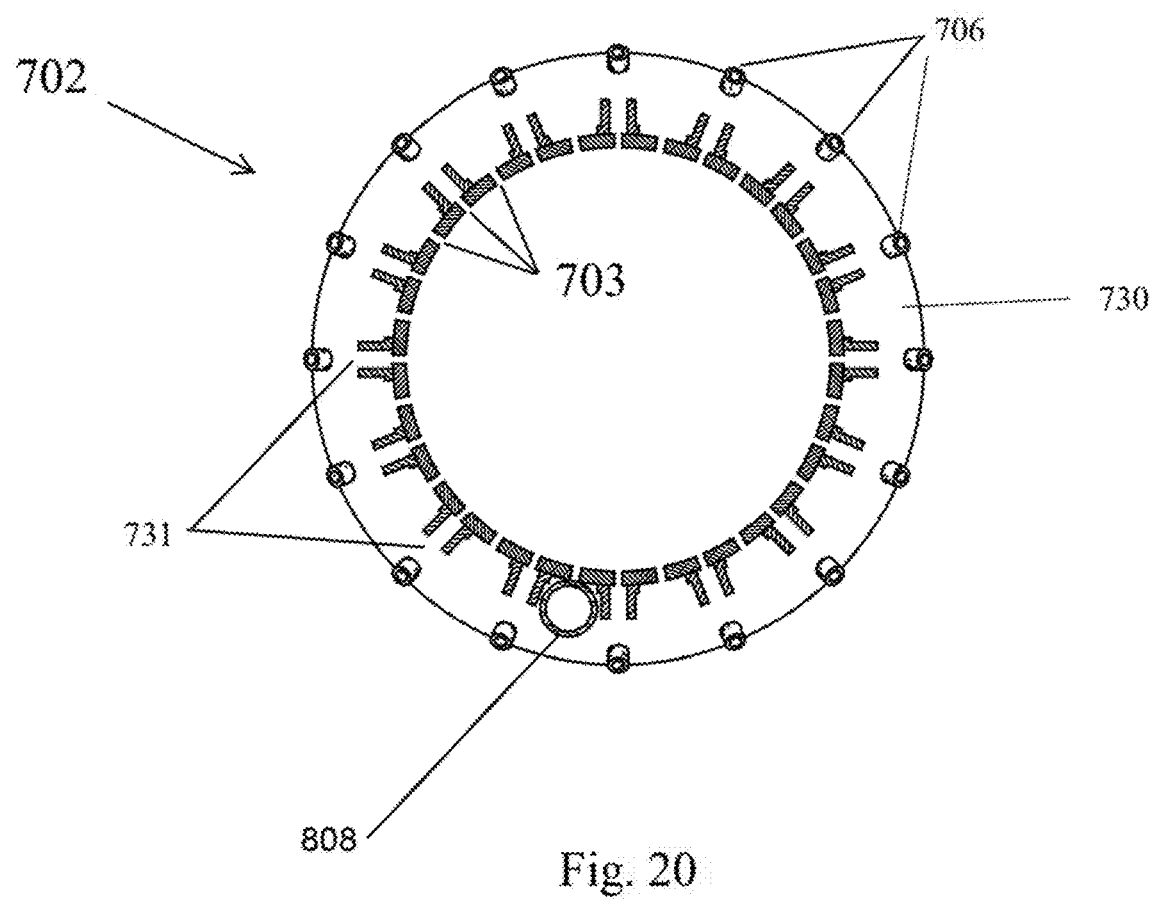
FIG. 20 is a top cross sectional view of the central vessel showing the jets on the outside of the vessel and without the comb.

FIG. 20 is a top cross sectional view of central vessel 702 in accordance with a preferred embodiment of the present invention. Jets 706 may be preferably located on the outside of the vessel 702. Vents 703 preferably allow for a flow of slurried sediment from the exterior of the vessel 702 into an inner cavity of the vessel. Slots 731 may protrude from an exterior surface of the vessel 702 to allow a vent comb 802 to slidably engage and clean the exterior of the vessel. Annular tube/pipe 730 may be positioned on a lower end of the vessel 702 to receive water from water supply pipe 808 and to allow water to exit the jets 706, for example.

Figure 21:
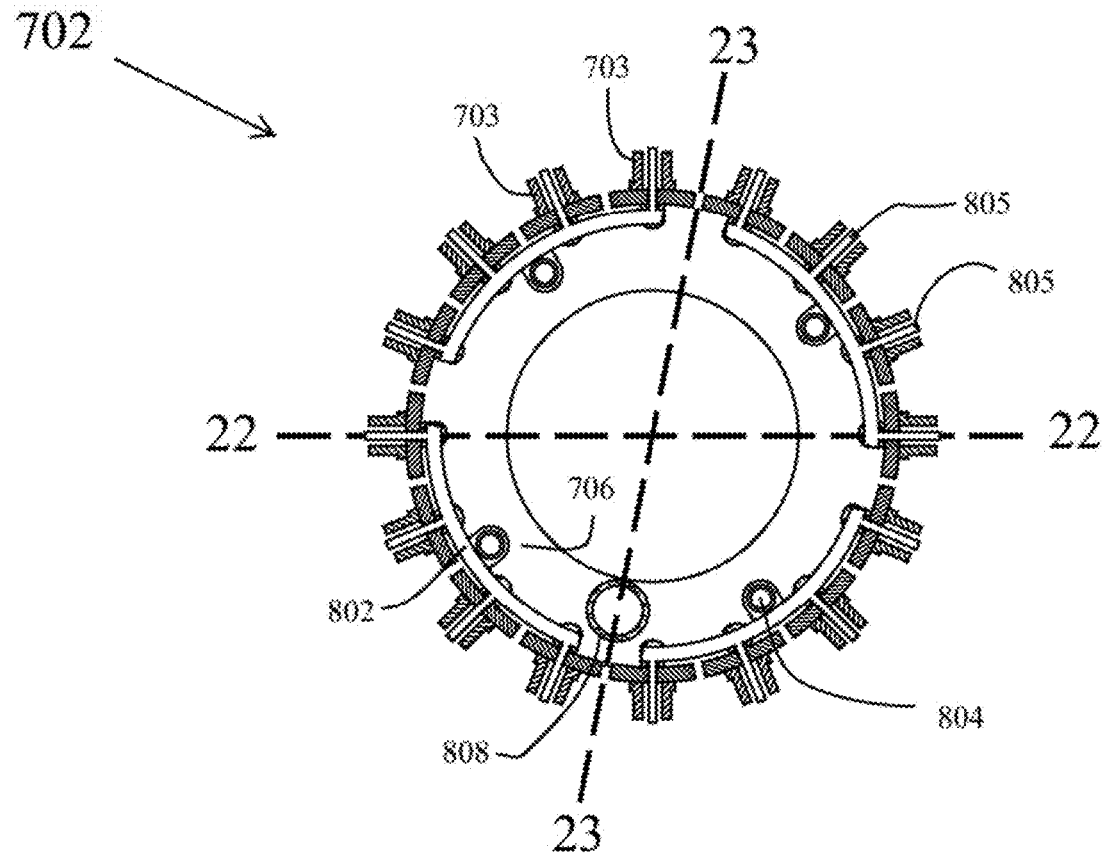
FIG. 21 is a top cross sectional view of the central vessel showing the comb and jet on the inside of the vessel and emanating out.

FIG. 21 is a top cross sectional view of central vessel 702 in accordance with a preferred embodiment of the present invention. FIG. 21 shows the vent comb 802 and jets 706 on the interior of the vessel 702 and emanating towards the exterior of the vessel 702. Blades 805 may be configured slide within vents 703 to clean the vents. The exemplary configuration in FIG. 21 preferably allows water to emanate from jets 706 and through vents 703 into a sediment layer 712, as shown in FIG. 22.

Figure 22:
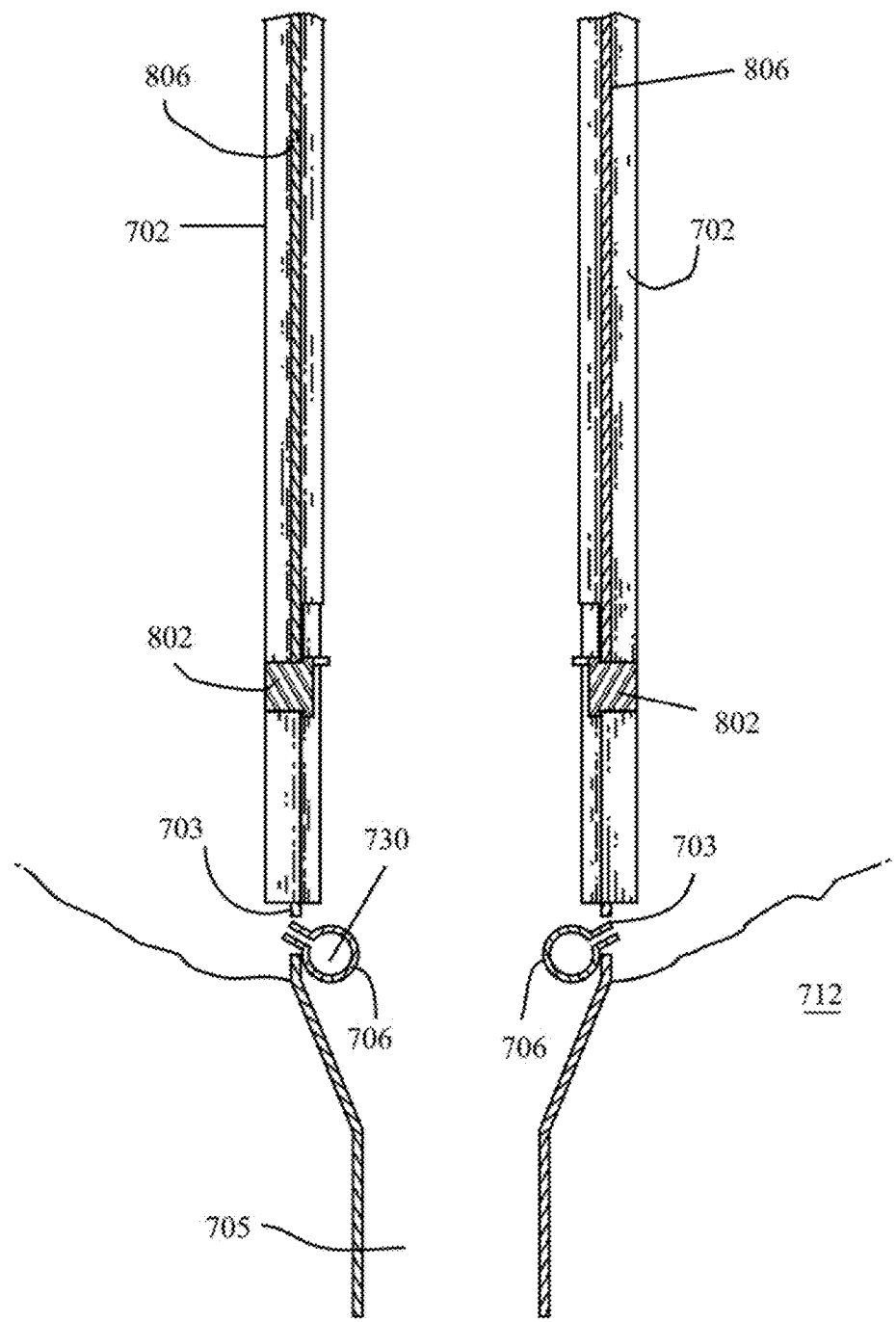
FIG. 22 is a side cross sectional view taken along the line 22-22 of FIG. 21.

FIG. 22 is a side cross sectional view taken along the line 22-22 of FIG. 21 in accordance with a preferred embodiment of the present invention. FIG. 22 shows an exemplary configuration of a vessel 702 with a steel piling 705 in a sediment layer 712. Jets 706 are preferably configured to receive water from annular pipe 730 and emit water through the vents 703. Actuator 806 may be configured to allow the vent comb 802 to slide upon either an exterior or interior surface of the vessel 702, depending on the configuration of the embodiment, to keep the vents clean to allow for the flow of slurried sediment into an interior cavity of the vessel 702.

Figure 23:
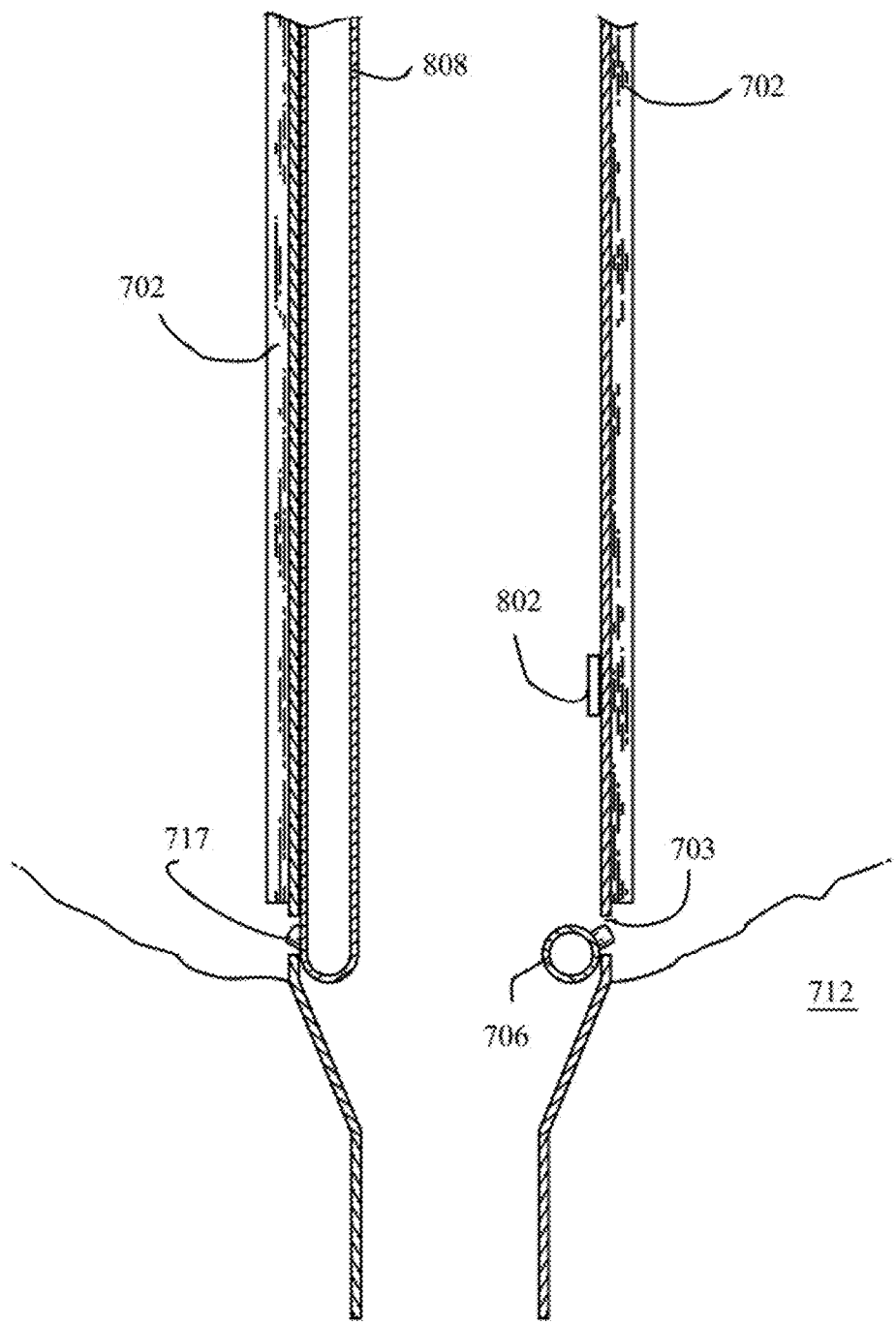
FIG. 23 is a side cross sectional view taken along the line 23-23 of FIG. 21, including cross section of water supply pipe. The left side shows the pipe (It's my understanding that there is only one pipe leading to the bottom area). The right side just shows the side of a comb.

FIG. 23 is a side cross sectional view taken along the line 23-23 of FIG. 21, including a cross section of water supply pipe 808, in accordance with a preferred embodiment of the present invention. Preferably, water supply pipe 808 joins annular pipe 730 to allow water to flow to the jets 706 and ultimately to jet opening 717. Comb 802 is shown in an exemplary configuration on an interior surface of the vessel 702.

Figure 24:
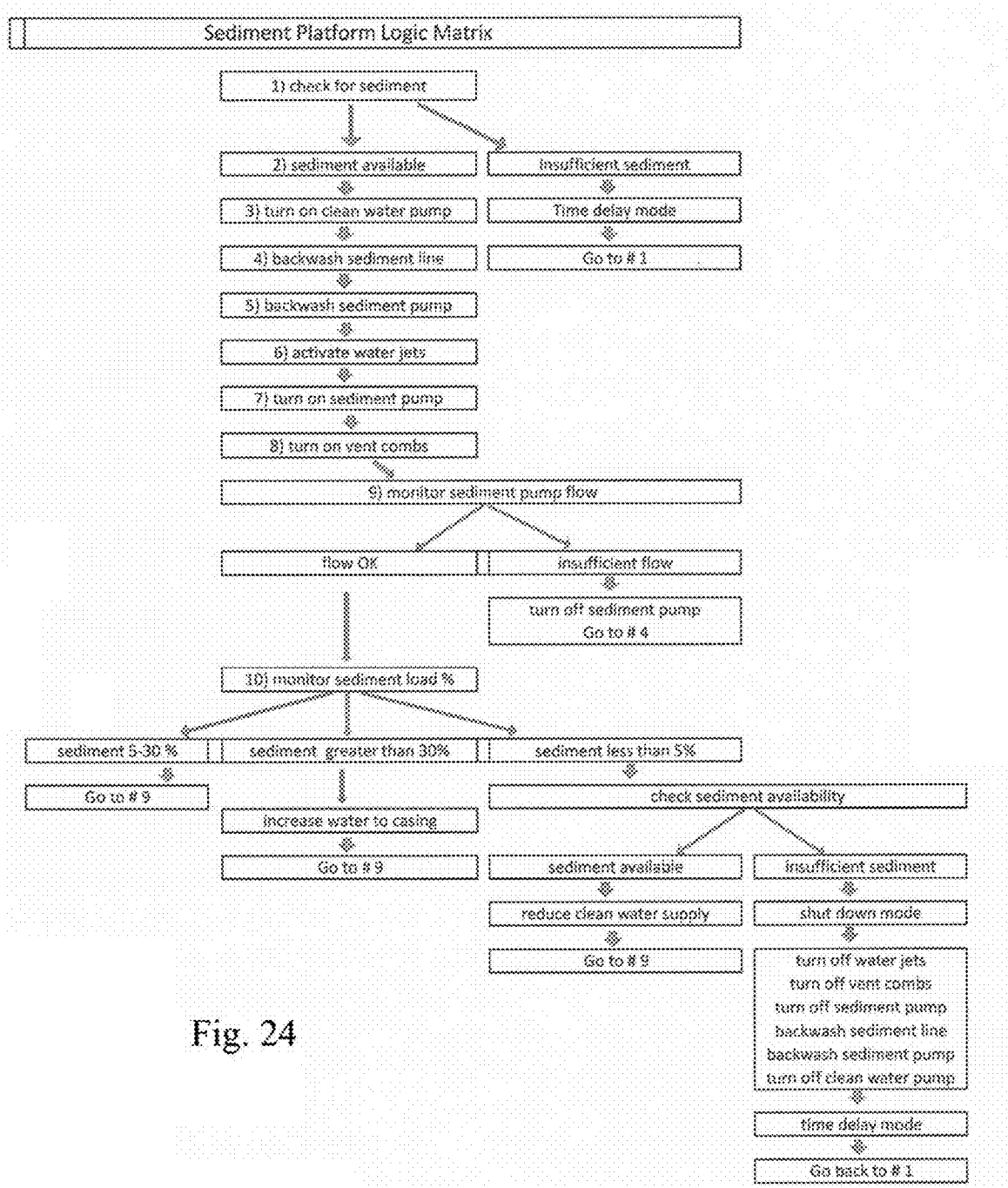
FIG. 24 is a flowchart showing a preferred embodiment of the method of the present invention.

FIG. 24 shows an exemplary flow chart of a preferred method of the present invention. FIG. 24 shows an exemplary Sediment Platform Logic Matrix.

Step 1 is to check for sediment 712. If insufficient sediment 712 is available, enter time delay mode and then go to step 1. If sediment 712 is available in step 2, then proceed to step 3 to turn on clean water pump 780, backwash the sediment line in step 4, backwash the sediment pump 704 in step 5, activate water jets 706 in step 6, turn on the sediment pump 704 in step 7, turn on vent combs 802 in step 8, and monitor sediment pump 704 flow in step 9. If step 9 reveals that the flow is sufficient, proceed to step 10. If step 9 reveals that the flow is insufficient, turn off the sediment pump 704 go to step 4.

Step 10 monitors the sediment load %. If the sediment is 5-30%, go to step 9. The amount of sediment in the water slurry mix leaving the method and apparatus can be measured using a sensor such as optical sensor 915. One embodiment of sensor 915 is shown in FIG. 38. If the sediment is greater than 30%, increase water to casing and then go to step 9. If the sediment less than 5%, then check the sediment availability. If sediment is available, reduce the clean water supply 780 and go to step 9. If sediment is not available, enter shut down mode, then turn off water jets 706, turn off vent combs 802, turn off sediment pump 704, backwash sediment line 716, backwash sediment pump 704, turn off clean water pump 780, begin time delay mode, then go back to step 1.

Figure 27:
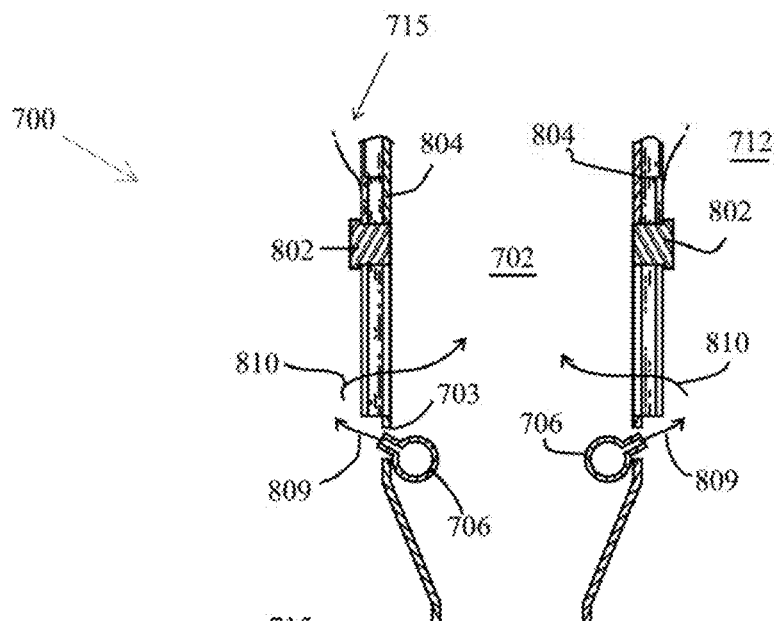
FIGS. 27-29 are sectional views of a sequence of a preferred embodiment of the method of the present invention with the combs on the outside of the vessel.

FIGS. 27-32 show an embodiment of a preferred method of the present invention. FIGS. 27-32 show an operation of the apparatus 700 wherein a sediment layer 712 is being pulverized, slurried or liquefied, and removed from the sediment pit 715. FIGS. 27-32 show sequences of the progression of the size of the sediment layer 712 decreasing while the side of the sediment pit 715 increases. FIG. 27 shows the apparatus 700 placed in the sediment layer 712. Water jets 706 preferably emit water into the sediment layer 712 in a direction indicated by arrow 809, creating movement within the sediment layer 712 to push sediment towards vents 703. Sediment enters the apparatus 700 through vents 703 and into the central vessel 702 as indicated by arrows 810. Vent comb 802 may be selectively actuated to clean the vents 703. The jets 706 and comb 802 and blades 805 pulverize, slurry, or liquefy the sediment layer 712 so that it can easily flow into vessel 702 and in outflow pipe 716.

When the operation begins, the sediment layer 712 and sediment pit 715 may have relative dimensions as shown, for example, in FIG. 27. As the operation continues, the relative sizes of the sediment layer 712 and sediment pit 715 may change as shown sequentially in FIGS. 28-32. The sizes of the sediment layer 712 and sediment pit 715 may be inversely proportional, as the size of the sediment pit 715 increases as the sediment is slurried or liquefied, and removed.

Figure 28:
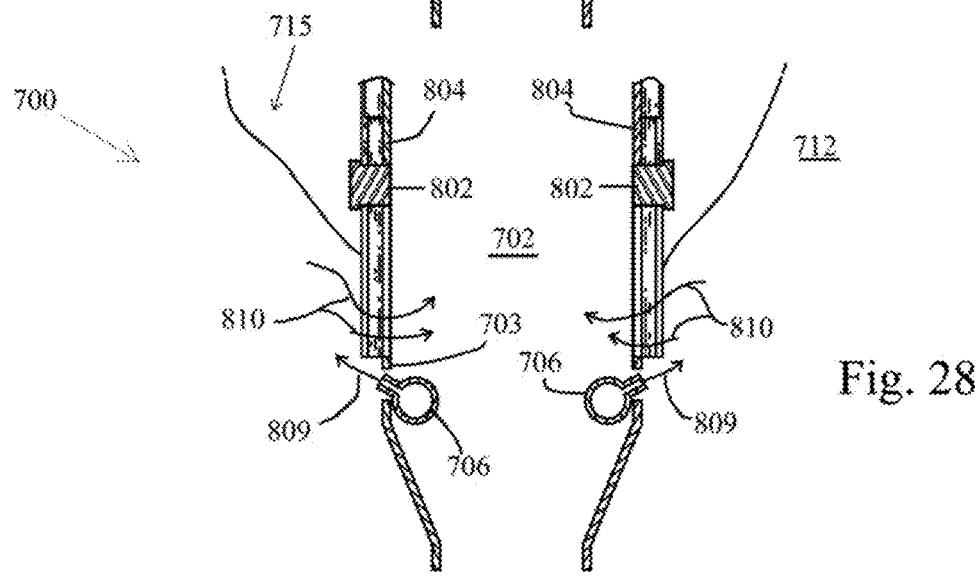
Figure 29:
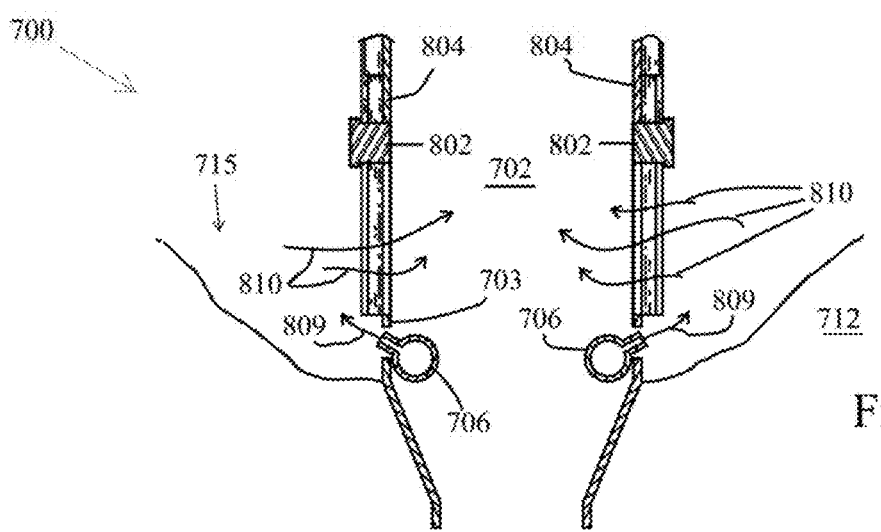
Figure 30:
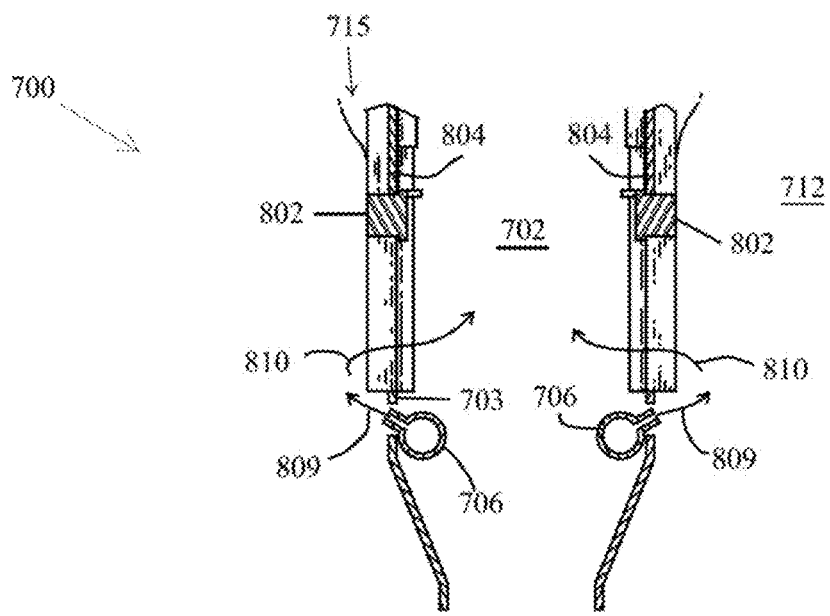
FIGS. 30-32 are sectional views of a sequence of a preferred embodiment of the method of the present invention with the combs on the inside of the vessel.
Figure 31:
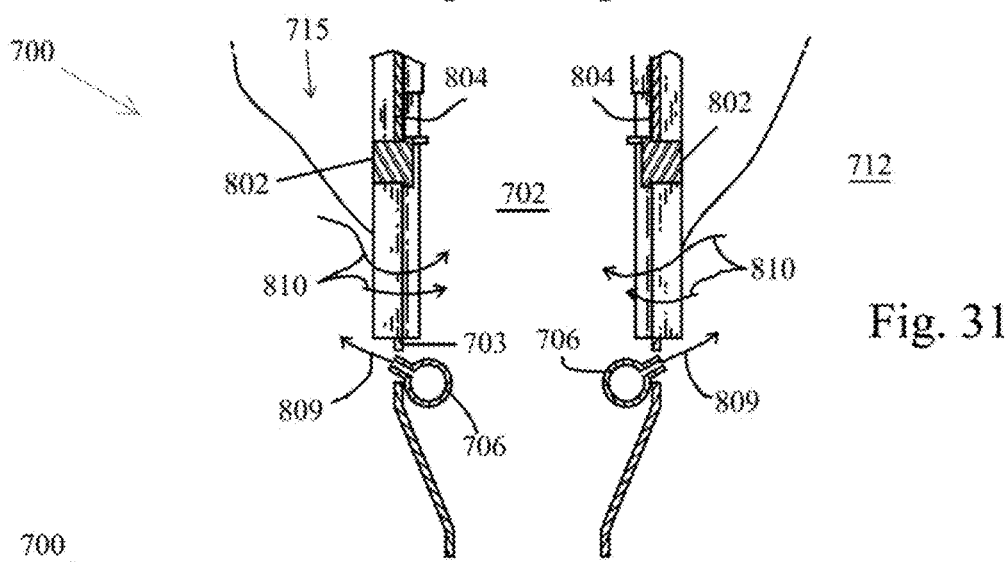
Figure 32:
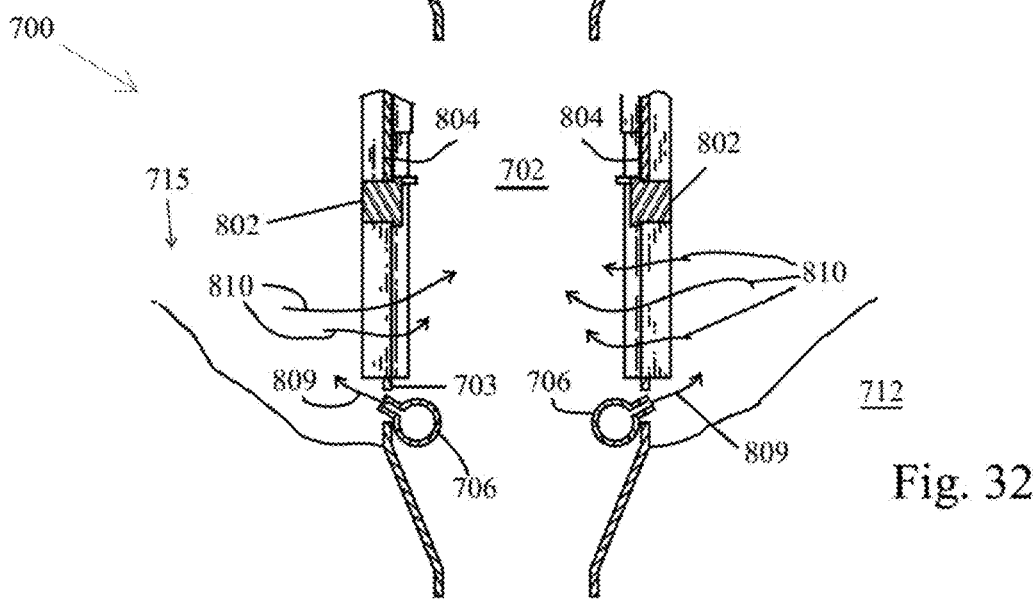

FIGS. 27-29 show an embodiment of a preferred method of the present invention with the combs 802 on the exterior of vessel 702. FIGS. 30-32 show an embodiment of a preferred method of the present invention with the combs 802 on the interior of vessel 702.

FIGS. 36 and 37 are side views of a flow switch of a preferred embodiment of the apparatus of the present invention. Electric switch 910 preferably having paddle 912 is preferably connected to sediment line 917 as seen in FIGS. 36 and 37. Paddle 912 is preferably turned or rotated when flow is present in sediment line 917. FIG. 36 shows paddle 912 in a closed position 923 wherein the sediment line 917 is shut off and indicates no flow 911. FIG. 37 shows paddle 912 in an open position 924 wherein the sediment line 917 is working and flow is present as indicated by arrow 913.

In one embodiment, electric switch 910 is preferably connected by wires 914 to a programmable logic controller (PLC), which PLC preferably monitors important parameters in real time and send the measurements into the computer.

Figure 39:
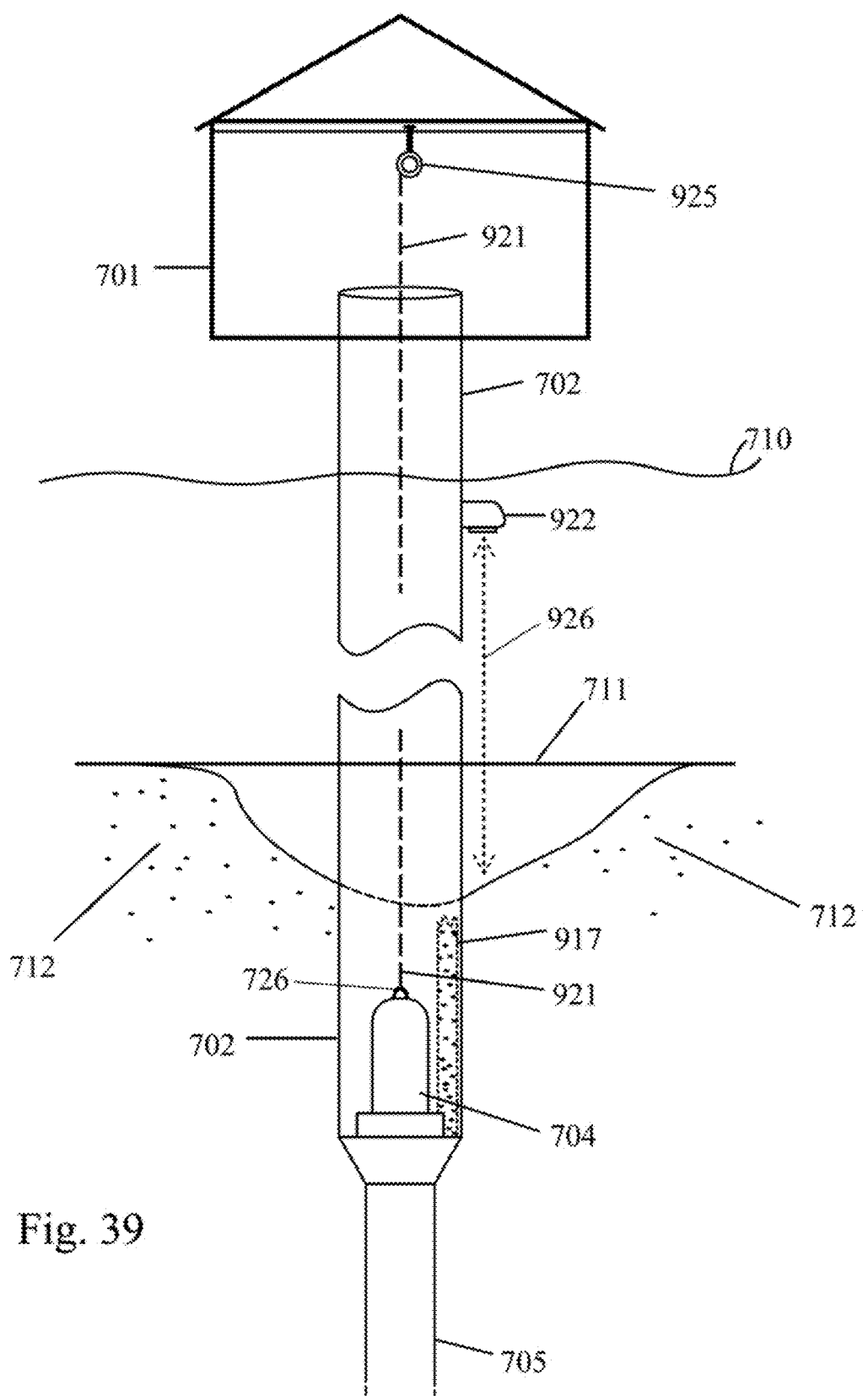
FIG. 39 is a side view of a preferred embodiment of the apparatus of the present invention of a sediment harvesting sink with a platform installed in a layer of sediment in a cross-section of a river.

FIG. 39 is a side view of a preferred embodiment of the apparatus of the present invention of a sediment harvesting sink with a platform 701 installed in a layer of sediment 712 in a cross-section of a river 740. Platform 701 preferably houses a crane or electric winch 925. Electric winch 925 is preferably connected to lift cable 921 that runs the length of central vessel 702. Lift cable 921 can be preferably attached to lift ring 726 on pump 704. In one embodiment, electric winch or crane 925 can preferably remove or install pump 704 into central vessel 702.

In one embodiment, ultrasonic transducer 922 is preferably used to convert ultrasound waves to electrical signals to monitor the depth of sediment pit 715, as indicated by arrow 926.

In one embodiment, electric winch or crane 925 can preferably remove and install jets 706 into central vessel 702. In one embodiment, electric winch or crane 925 can preferably remove and install vent comb 802 into central vessel 702.

PARTS LIST

The following is a list of parts and materials suitable for use in the present invention:

| Parts Number | Description |
| --- | --- |
| 10 | Sediment harvesting apparatus |
| 100 | River Bottom/river bed |
| 101 | Platform |
| 102 | River Surface |
| 103 | Electrical Power Line/power supply |
| 104 | Shelter |
| 105 | Hydraulic/Electrical/Control Connections; Electrical Control Cables |
| 106 | Grating |
| 107 | Sediment Sink |
| 108 | Piling |
| 109 | Pipeline |
| 110 | Sandbar/sediment |
| 111 | Depth of Sediment Pit |
| 112 | Sediment Pit Wall |
| 113 | Sediment Pit Width |
| 114 | Flood Protection Levee |
| 115 | Venturi Tube |
| 116 | Auger |
| 117 | Sediment Pit |
| 118 | Water Jet |
| 119 | Sediment Conveyor |
| 120 | Main Flow Control Valve |
| 121 | Sediment Pump |
| 122 | Water Suction Supply |
| 123 | Platform Legs |
| 124 | Support Structure |
| 125 | Inlets |
| 126 | Pulsing Valve |
| 127 | Depth Contours |
| 128 | Sediment Feeders |
| 129 | Manifold |
| 130 | Delivery Pipeline |
| 131 | River Navigational Channel |
| 132 | River Bank |
| 140 | Shut-off Valve |
| 150 | Side Wall |
| 151 | Cavity |
| 152 | River Channel |
| 170 | Arrows |
| 180 | Water Pump |
| 190 | Pipe |
| 200 | Sediment Sink Apparatus |
| 201 | Sediment Wall |
| 202 | Grating |
| 203 | Support Structure |
| 204 | Pilings |
| 205 | Side Wall |
| 206 | Clean Water Suction Supply |
| 207 | Flow Control Valve |
| 208 | Auger |
| 209 | Venturi Tube |
| 210 | Water Jets |
| 211 | Sediment Pump |
| 212 | Outflow Pipeline |
| 213 | River Surface |
| 214 | Water depth |
| 215 | Normal River Bottom |
| 216 | Sediment Sink |
| 217 | Width of Sediment Pit |
| 218 | Depth of Sediment Pit |
| 219 | Sediment Pit |
| 240 | Shut-off Valve |
| 251 | Cavity |
| 252 | River Channel |
| 290 | Pipe |
| 700 | Apparatus |
| 701 | Platform |
| 702 | Central Vessel |
| 703 | Vents |
| 704 | Sediment Pump |
| 705 | Steel Piling |
| 706 | Water Jets |
| 707 | Depth of the Sediment Pit |
| 708 | Width of the Sediment Pit |
| 709 | Pipes, Wires, etc. |
| 710 | Waterway Surface |
| 711 | Normal Bottom Surface |
| 712 | Sediment/Sediment Layer |
| 713 | Navigational Channel |
| 714 | Electrical Power Line |
| 715 | Sediment Pit |
| 716 | Outflow Pipeline |
| 717 | Jet opening |
| 718 | Arrow indicating flow rotation |
| 719 | Sediment pit perimeter |
| 720 | Directional Flow Control Valve |
| 721 | Water flow to sediment outflow line |
| 722 | Water flow to backflush the sediment pump |
| 723 | Water flow to water jets |
| 724 | Water flow to central vessel |
| 725 | Shelter |
| 726 | Remote control valve |
| 727 | Lift ring |
| 728 | Clean water inlet/water source |
| 729 | Steel sheet pilings |
| 730 | Pipe/Tube |
| 731 | Slot |
| 732 | Grating |
| 740 | Waterway |
| 750 | Sheet piling enclosed casing |
| 780 | Water Pump |
| 801 | Vessel Wall |
| 802 | Vent Comb |
| 804 | Actuator Attachment Point |
| 805 | Blades |
| 806 | Actuator |
| 807 | Guide |
| 808 | Water Supply Pipe |
| 809 | Arrow |
| 810 | Arrow |
| 910 | Electric switch |
| 911 | No flow |
| 912 | Paddle |
| 913 | Arrow indicating flow |
| 914 | Wires |
| 915 | Optical beam sensor/transmitter |
| 916 | Glass plate |
| 917 | Sediment line |
| 918 | Optical sensor |
| 919 | Sediment/water mass flow meter |
| 920 | Water/sediment flow |
| 921 | Lift cable |
| 922 | Ultrasonic depth transducer |
| 923 | Closed position |
| 924 | Open position |
| 925 | Electric winch |
| 926 | Arrow |
| 1010 | System |
| 1200 | System |
| 1700 | System |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. An apparatus for removing sediment from a bottom of a waterway and pumping the sediment through pipelines, comprising:
   a) a platform positionally fixed above a water surface of the waterway;
   b) a central vessel having an upper end portion, a lower end portion, and an interior, wherein the central vessel is connected to the platform at the upper end portion and anchored in the bottom of the waterway at the lower end portion;
   c) one or more water jets mounted on the lower end portion of the central vessel for liquefying or slurrying sediment;
   d) one or more vents at the lower end portion of the central vessel for filtering said slurried or liquefied sediment; and
   e) a pump positioned in the central vessel interior for removing said slurried or liquefied sediment from the central vessel interior via an outflow pipeline.

2. The apparatus of claim 1 further comprising a second pump and flow control valve located on the platform.

3. The apparatus of claim 2, wherein the flow control valve is used for directing water flow from the second pump to any of the following: 1) the outflow pipeline, 2) the pump for removing said slurried or liquefied sediment, 3) the one or more water jets, and/or 4) the central vessel interior.

4. The apparatus of claim 1, further comprising a grating on the one or more vents.

5. The apparatus of claim 1, further comprising a comb slidably attached on the interior of the central vessel, said comb having blades positioned in said one or more vents for movably clearing said one or more vents.

6. The apparatus of claim 1, wherein the one or more water jets are positioned at various locations on the one or more vents.

7. A method of removing sediment from a waterway bottom and pumping the sediment through pipelines, comprising:
   a) positionally fixing a central vessel in the bottom of the waterway, said central vessel having a top, a lower portion and an interior, and mounting a platform on said top of the central vessel and above a water surface;
   b) slurrying or liquefying sediment with one or more water jets on the lower portion of the central vessel;
   c) filtering said slurried or liquefied sediment into said central vessel via one or more vents at the lower portion of the central vessel; and
   d) pumping the sediment out of the central vessel and away from the water bottom via an outflow pipeline.

8. A system for sediment control and altering the average effective depth in a section of waterway comprising positionally fixing a plurality of the apparatuses as in claim 1 in series, wherein the apparatuses are placed in a river bed within a sand bar outside of a river navigational channel.

9. A system for sediment control and altering the average effective depth in a section of a waterway comprising positionally fixing a plurality of the apparatuses as in claim 1 in parallel, wherein the apparatuses are placed in a river bed within a sand bar outside of a river navigational channel.

10. The system of claim 8, wherein the system decreases the river's flow velocity.

11. An apparatus for removing sediment from a bottom of a waterway comprising:
   a) a platform positionally fixed above a water surface of the waterway;
   b) a central vessel connected to the platform and anchored in the bottom of the waterway, the central vessel having an upper end portion, a lower end portion, an exterior wall and an interior;
   c) a flow control valve and a water pump are housed on said platform;
   d) one or more vents positioned on the lower end portion of the central vessel used to filter the sediment into the central vessel interior;
   d) one or more water jets mounted in the central vessel interior and positioned above and below the vents, said water jets fluidly connected to the water pump and used to slurry or liquefy the sediment entering said vents;
   e) a sediment pump positioned in the central vessel interior and next to the vents, said sediment pump fluidly connected to an outflow pipeline.

12. The apparatus of claim 11, wherein the platform further comprises a shelter.

13. The apparatus of claim 11, wherein the platform further comprises an electric power supply.

14. The apparatus of claim 11, wherein the central vessel is a large diameter steel pipe.

15. The apparatus of claim 11, wherein the water jets emit water through the vents.

16. The apparatus of claim 11, wherein the lower end portion of the central vessel includes an anchoring piling.

17. The apparatus of claim 11, wherein the sediment pump is removable.

18. The apparatus of claim 11, wherein the water jets are removable.

19. The apparatus of claim 11, wherein the central vessel comprises interlocking steel panels.

20. The apparatus of claim 11, further comprises a plurality of sediment conveyors operably connected to the flow control valve.

21. The apparatus of claim 11, wherein the water jets are angled in the central vessel and are configured to create a counterclockwise rotation of sediment around the exterior of the central vessel.

* * * * *